(12) United States Patent
Liu et al.

(10) Patent No.: US 12,097,557 B2
(45) Date of Patent: Sep. 24, 2024

(54) METHOD AND SYSTEM FOR MANUFACTURING A STRUCTURE

(71) Applicant: City University of Hong Kong, Kowloon (HK)

(72) Inventors: Chain Tsuan Liu, Kowloon (HK); Tianlong Zhang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 271 days.

(21) Appl. No.: 17/012,507

(22) Filed: Sep. 4, 2020

(65) Prior Publication Data

US 2022/0072610 A1 Mar. 10, 2022

(51) Int. Cl.
| | | |
|---|---|---|
| *B22F 10/00* | (2021.01) | |
| *B33Y 10/00* | (2015.01) | |
| *B33Y 70/00* | (2020.01) | |
| *B22F 10/10* | (2021.01) | |
| *B33Y 30/00* | (2015.01) | |

(52) U.S. Cl.
CPC .............. *B22F 10/00* (2021.01); *B22F 10/10* (2021.01); *B22F 2202/11* (2013.01); *B22F 2301/052* (2013.01); *B22F 2301/058* (2013.01); *B22F 2301/10* (2013.01); *B22F 2301/155* (2013.01); *B22F 2301/205* (2013.01); *B22F 2301/30* (2013.01); *B22F 2301/35* (2013.01); *B22F 2998/10* (2013.01); *B33Y 10/00* (2014.12); *B33Y 30/00* (2014.12); *B33Y 70/00* (2014.12)

(58) Field of Classification Search
CPC ...... B22F 10/00; B22F 10/10; B22F 2202/11; B22F 2301/052; B22F 2301/058; B22F 2301/10; B22F 2301/155; B22F 2301/205; B22F 2301/30; B22F 2301/35; B22F 2998/10; B22F 2999/00; B22F 1/09; B22F 10/28; B33Y 10/00; B33Y 70/00; Y02P 10/25
See application file for complete search history.

(56) References Cited

U.S. PATENT DOCUMENTS

| | | |
|---|---|---|
| 10,343,217 B2 | 7/2019 | Zhang et al. |
| 10,422,026 B2 | 9/2019 | Ozbaysal et al. |
| 10,544,311 B2 | 1/2020 | Zhao et al. |

(Continued)

OTHER PUBLICATIONS

Martin et al., "Ultrafast dynamics of laser-metal interactions in additive manufacturing alloys captured by in situ X-ray imaging," Materials Today Advances 1 (2019), pp. 1-9. (Year: 2019).*

(Continued)

*Primary Examiner* — John A Hevey
(74) *Attorney, Agent, or Firm* — Renner, Kenner, Greive, Bobak, Taylor & Weber

(57) ABSTRACT

A method and a system for manufacturing a structure includes the steps of: (a) supplying a mixture consisting a plurality of primitive materials at a target spot; (b) melting and solidifying the mixture disposed at the target spot to form a portion of a metallic structure consisting of an alloy of the plurality of the primitive materials; and (c) repeating steps (a) and (b) at a plurality of target spots in a three-dimensional space to produce the metallic structure of the alloy.

5 Claims, 28 Drawing Sheets
(4 of 28 Drawing Sheet(s) Filed in Color)

(56) References Cited

U.S. PATENT DOCUMENTS

| | | | |
|---|---|---|---|
| 2006/0075850 A1* | 4/2006 | Brice | B23K 35/0244 75/336 |
| 2015/0044084 A1* | 2/2015 | Hofmann | C04B 35/01 264/642 |
| 2017/0326690 A1* | 11/2017 | Heard | B33Y 70/10 |
| 2019/0161835 A1 | 5/2019 | Martin et al. | |
| 2020/0024700 A1 | 1/2020 | Martin et al. | |

OTHER PUBLICATIONS

Cher Fu Tey et al., "Additive manufacturing of multiple materials by selective laser melting: Ti-alloy to stainless steel via a Cu-alloy interlayer," Additive Manufacturing, vol. 31, Jan. 2020, pp. 1-16. (Year: 2020).*

W. Xu et al., "Additive Manufacturing of strong and ductile Ti—6Al—4V by selective laser melting via in situ martensite decomposition," Acta Materialia, 85, (2015), pp. 74-84. (Year: 2015).*

Zhang, D. et al., Additive manufacturing of ultrafine-grained high-strength titanium alloys, Nature 576, 91-95; 10.1038/s41586-019-1783-1 (2019).

C. J. Todaro, et al., "Grain structure control during metal 3D printing by high-intensity ultrasound". Nature Communications 11, 1-9; 10.1 038/s41467-019-13874-z, Pub. Jan. 2020.

* cited by examiner

METHOD AND SYSTEM FOR MANUFACTURING A STRUCTURE

TECHNICAL FIELD

The invention relates to a method of manufacturing a structure, and particularly, although not exclusively, to a method of manufacturing a metallic structure of an alloy. The invention also relates to a system for manufacturing a structure.

BACKGROUND

Additive manufacturing, also known as 3D printing, may be applied for fabricating 3D structures with different shapes and dimensions.

Alloys are often used in our daily life since they can exhibit different properties, making them suitable for different applications. However, alloy design may be resource intensive and time consuming for some complex alloy system. The additive manufacturing technology enables the creation of more ductile, stronger, and lighter structural materials and systems for use in various applications.

SUMMARY OF THE INVENTION

In accordance with a first aspect of the invention, there is provided a method of manufacturing a structure, comprising the steps of: (a) supplying a mixture including a plurality of primitive materials at a target spot; (b) melting and solidifying the mixture disposed at the target spot to form a portion of a metallic structure including an alloy of the plurality of the primitive materials; and (c) repeating steps (a) and (b) at a plurality of target spots in a three-dimensional space to produce the metallic structure of the alloy. In some embodiments, the mixture consists of a plurality of primitive materials and the metallic structure consists of an alloy of the plurality of the primitive materials.

In one embodiment of the first aspect, steps (a) to (c) are performed using an additive manufacturing process.

In one embodiment of the first aspect, step (b) comprises melting the mixture with a laser beam or an electron beam or an arc beam with a predetermined period of time and/or a predetermined dosage of irradiation.

In one embodiment of the first aspect, the plurality of primitive materials is substantially uniformly distributed in the mixture.

In one embodiment of the first aspect, the method further comprises the step of mixing the plurality of primitive materials to form the mixture by mechanical vibrating, ultrasonic vibrating, stirring, and/or grinding.

In one embodiment of the first aspect, step (a) comprises adjusting ratio of the plurality of primitive materials in the mixture, or flow rate of the mixture.

In one embodiment of the first aspect, each of the plurality of primitive materials comprises a metal powder or a metal wire.

In one embodiment of the first aspect, step (a) comprises supplying the plurality of primitive materials using powder spreading, powder feeding, spraying, or wire feeding.

In one embodiment of the first aspect, each of the plurality of primitive materials comprises an elemental metal or an alloy.

In one embodiment of the first aspect, the plurality of primitive materials comprises a Ti alloy, a stainless steel, an Al alloy, a Ni-based alloy, a Co-based alloy, a Cu alloy, a Mg alloy, a die steel, a martensitic steel, a ferritic steel, a high entropy alloy, a Zn alloy, a CoCr alloy, or a CoCrMo alloy.

In one embodiment of the first aspect, the mixture comprises 60 wt %-100 wt % of a Ti alloy.

In one embodiment of the first aspect, the mixture comprises 0 wt %-40 wt % of a stainless steel, an Al alloy, a Ni-based alloy, a Co-based alloy, a Cu alloy, a Mg alloy, a die steel, a martensitic steel, a ferritic steel, a high entropy alloy, a Zn alloy, a CoCr alloy, or a CoCrMo alloy.

In accordance with a second aspect of the invention, there is provided a system for manufacturing a structure, comprising: a primitive material dispenser arranged to supply a mixture including a plurality of primitive materials at a target spot; an energy source arranged to melt the mixture disposed at the target spot, wherein the mixture is allowed to solidify after melting so as to form a portion of a metallic structure including an alloy of the plurality of primitive materials; and a mechanical structure arranged to move the primitive material dispenser and/or the portion of the metallic structure such that a plurality of portions of the metallic structure are formed at a plurality of target spots in a three-dimensional space to produce the metallic structure of the alloy. In some embodiments, the mixture consists of a plurality of primitive materials and the metallic structure consists of an alloy of the plurality of the primitive materials In one embodiment of the second aspect, the primitive material dispenser, the energy source, and the mechanical structure combine to operate as an additive manufacturing system.

In one embodiment of the second aspect, the energy source comprises a laser beam, an electron beam, or an arc beam.

In one embodiment of the second aspect, the energy source is arranged to irradiate the mixture disposed at the target spot for a predetermined period of time and/or with a predetermined dosage of irradiation to melt the mixture.

In one embodiment of the second aspect, the plurality of primitive materials is substantially uniformly distributed in the mixture.

In one embodiment of the second aspect, the primitive material dispenser comprises a mechanical vibrator, an ultrasonic vibrator, a stirrer, or a grinder arranged to mix the plurality of primitive materials to form the mixture.

In one embodiment of the second aspect, the primitive material dispenser comprises a mixture dispensing unit arranged to supply the mixture with a determined flow rate at the target spot.

In one embodiment of the second aspect, the primitive material dispenser comprises a plurality of primitive material dispensing units each arranged to supply one of the pluralities of primitive materials with a determined amount to form the mixture.

In one embodiment of the second aspect, each of the plurality of primitive materials comprises a metal element or an alloy in a powder form.

In one embodiment of the second aspect, the primitive material dispenser comprises a powder spreader, a powder feeder, a sprayer arranged to supply the plurality of primitive materials.

In one embodiment of the second aspect, each of the plurality of primitive materials comprises a metal element or an alloy in a wire form.

In one embodiment of the second aspect, the primitive material dispenser comprises a wire feeder arranged to supply the plurality of primitive materials.

In one embodiment of the second aspect, the mechanical structure comprises a dispenser moving unit arranged to move the primitive material dispenser from a target spot to another target spot in the three-dimensional space.

In one embodiment of the second aspect, the mechanical structure comprises a moving platform arranged to move the portion of the metallic structure or the metallic structure.

In accordance with a third aspect of the invention, the method of the first aspect is arranged to be performed by the system of the second aspect.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the invention will now be described, by way of example, with reference to the accompanying drawings in which.

DETAILED DESCRIPTION OF THE PREFERRED EMBODIMENT

The inventors have devised that, unexpected problems may be encountered in large-scale alloy manufacturing by using some example alloy design paradigms, which involves melting, casting, homogenization, rolling, forging, aging, testing, etc., due to changes in size, processing route and purity. This deteriorates the reliability of the traditionally designed and manufactured alloys. Therefore, the development of a new method for rapid alloy design is imperative.

Figure 1:
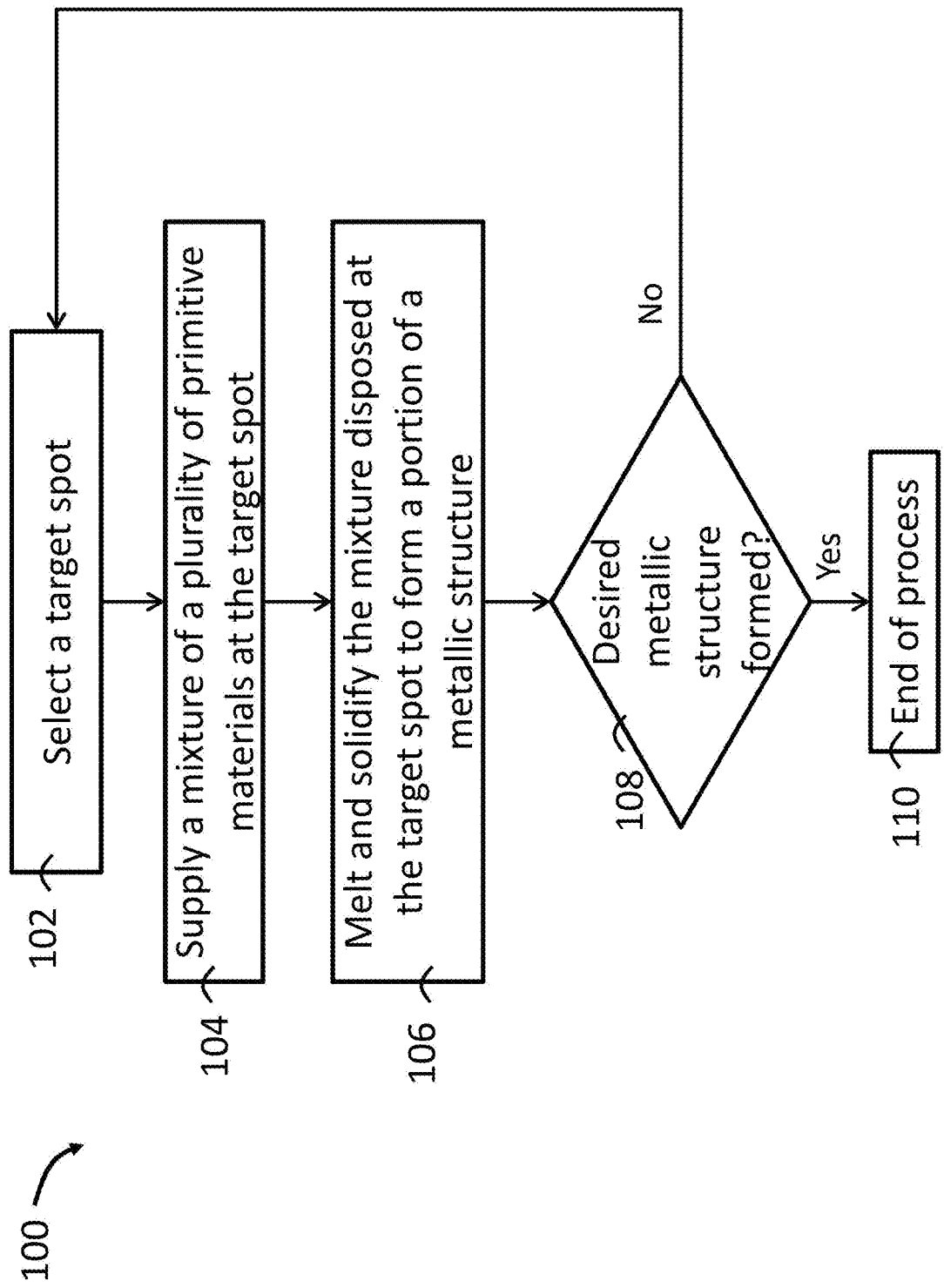
FIG. 1 is a flow diagram illustrating a method of manufacturing a structure according to one embodiment of the invention.
Figure 2:
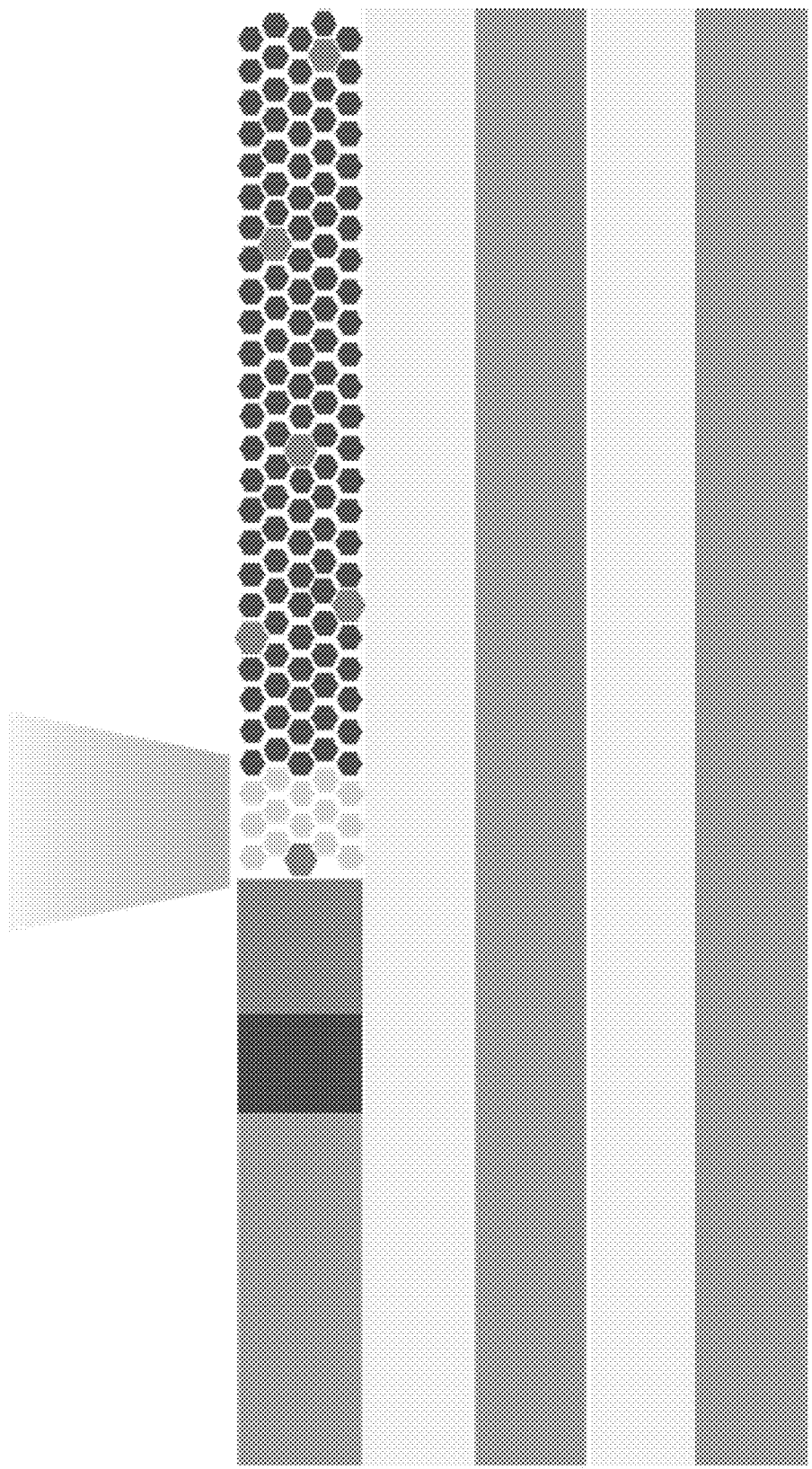
FIG. 2 is a schematic diagram illustrating the method of FIG. 1 according to one example embodiment.

With reference to FIGS. 1 and 2, there illustrates a method 100 of manufacturing a structure according to one embodiment of the invention. Specifically, although not exclusively, the method is 100 designed for manufacturing a metallic structure of an alloy in a three-dimensional (3D) space in situ. Preferably, the method 100 is performed using an additive manufacturing process, utilizing common techniques such as selective laser melting (SLM), electron beam melting (EBM), selective laser sintering (SLS), laser direct metal deposition (LDMD), laser melting deposition (LMD), Laser deposition welding (LDW), etc.

In a preferred embodiment, the method 100 is performed with a system that is operable as an additive manufacturing system. In this embodiment, the system includes a build platform where the metallic structure is built upon, a primitive material dispenser arranged to supply a mixture consisting a plurality of primitive materials at a target spot, and an energy source arranged to melt the mixture disposed at the target spot, where the mixture is allowed to solidify after melting so as to form a portion of a metallic structure consisting of an alloy of the plurality of primitive materials. The system further includes a mechanical structure arranged to move the primitive material dispenser and/or the portion of the metallic structure such that a plurality of portions of the metallic structure are formed at a plurality of target spots in a 3D space to produce the metallic structure of the alloy.

For simplicity, the method 100 will be discussed hereinafter using the system in the above preferred embodiment. The method 100 first starts, in step 102, with selecting a target spot on the build platform of the system. In one embodiment, the mechanical structure of the system includes a dispenser moving unit that moves the primitive material dispenser over the build platform to the target spot, so that the mixture is supplied at the desired target spot on the build platform.

Additionally or alternatively, the mechanical structure may include e a moving platform to move the portion of the metallic structure or the entire metallic structure with respect to the primitive material dispenser, so that the mixture is supplied at the desired target spot on the build platform. For example, the moving platform may be integrated with the build platform.

Yet alternatively, moving the material to the spot is not always necessary. For example, the process may instead involve moving the beam spot to the powder bed, e.g. along the x/y horizontal plane. This method may be more suitable for platforms which only move vertically (upward/downward) or in the z-axis.

In one example embodiment, the process may include the following steps: 1) the machine spread a layer of metal powders uniformly onto the platform; 2) the laser beam moves in the horizontal plane as set previously by the computer to print a two-dimensional (2D) pattern; 3) the platform moves downwards; and 4) repeat of 1)-3).

In an alternative 3D printing process, the powders are not spread on the platform, but jet directly on the beam spot; however, instead of the moving the dispenser or the platform, the beam moves and the jet move along with the beam. As appreciated by a skilled person in the art, the target printing spot instead of the dispenser may move so as to form the required material on different spots.

The method 100 then proceeds to step 104, with supplying a mixture of a plurality of primitive materials at the selected target spot with the primitive material dispenser containing the mixture. Additionally, step 104 may include first supplying a plurality of primitive materials for forming the mixture to be supplied at the target spot. In such embodiment, the primitive material dispenser may be arranged to contain both the primitive materials and means to melt the mixture, such that the process of forming the mixture from the primitive materials may be performed in the primitive material dispenser.

Each of the plurality of primitive materials may include an elemental metal or an alloy. Preferably, each of the plurality of primitive materials includes a titanium (Ti) alloy, a stainless steel, an aluminum (Al) alloy, a nickel-based (Ni-based) alloy, a cobalt-based (Co-based) alloy, a copper (Cu) alloy, a magnesium (Mg) alloy, a die steel, a martensitic steel, a ferritic steel, a high entropy alloy, a zinc (Zn) alloy, a cobalt-chromium (CoCr) alloy, or a cobalt-chromium-molybdenum (CoCrMo) alloy, or a combination thereof.

In some embodiments, the Ti alloy includes common commercial Ti alloys such as CP—Ti, Ti-6Al-4V, Ti-5553, Ti-6242, Ti-6246, TI-1023, Ti-3Al-2.5V, Ti-15V-3Cr-3Sn-3Al, Ti-15Mo-5Zr-3Al, or a combination thereof.

The plurality of primitive materials may be supplied in a powder form, a wire form, or other suitable forms with different shapes. Preferably, the plurality of primitive materials are supplied using powder spreading, powder feeding, spraying, or wire feeding with a powder spreader, a powder feeder, a sprayer, or a wire feeder, respectively, of the primitive material dispenser. In embodiments where the primitive materials are supplied in the form of a metal powder, the size of the powders is between 10 μm and 200 μm.

The method also includes the step of mixing the plurality of primitive materials to form the mixture to be supplied at the target spot. Preferably, the mixture of the plurality of primitive materials is a mixture having a substantially uniform distribution state of different types of the plurality of primitive materials (e.g. different types of metal powders). Advantageously, such uniform distribution facilitates the subsequent steps of melting and solidifying, as will be discussed below. Different mechanical or chemical methods may be performed in order to achieve the desired uniform distribution of the plurality of primitive materials in the mixture.

In one embodiment, this step is performed using a blender mixer or other methods including mechanical vibration, ultrasonic vibration, stirring, grinding, etc. to mix the plurality of primitive materials to form the mixture. In such embodiment, the step of mixing the primitive materials to form the mixture may be performed before the mixture entering the primitive material dispenser.

Additionally, this step may be performed by adjusting the flow rate of the mixture prior to or while supplying the mixture at the target spot. This may be carried out by a mixture dispensing unit of the primitive material dispenser arranged to supply the mixture with a determined flow rate at the target spot.

In another embodiment, this step is performed by adjusting the ratio of the primitive materials in the mixture during the step of supplying the plurality of primitive materials. This may be carried out by a plurality of primitive material dispensing units of the primitive material dispenser each arranged to supply one of the plurality of primitive materials with a determined amount to form the mixture prior to or while supplying the mixture at the target spot.

In one embodiment, the mixture comprises 60 wt %-100 wt % of a Ti alloy, and 0 wt %-40 wt % of a stainless steel, an Al alloy, a Ni-based alloy, a Co-based alloy, a Cu alloy, a Mg alloy, a die steel, a martensitic steel, a ferritic steel, a high entropy alloy, a Zn alloy, a CoCr alloy, or a CoCrMo alloy, or a combination thereof.

In step 106, the mixture disposed at the target spot is irradiated and melted by the energy source and solidified to form a portion of the metallic structure of the alloy. The step of melting is preferably performed with a laser beam, an electron beam or an arc beam for a predetermined period of time, and the subsequent step of solidifying the molten mixture is performed by removing the energy source after the predetermined period of time has passed, the allowing mixture to solidify.

Additionally or alternatively, the step of melting is performed with a laser beam, an electron beam or an arc beam with a predetermined dosage of irradiation. In one embodiment, the power of the energy source used is 100 W to 100000 W, and the size of the energy source is 10 μm to 10 mm.

In step 108, it is determined whether the desired metallic structure is formed. This step may be carried out manually by visual inspection, or automatically by a computing device of the system that is capable of, for example, scanning and analyzing the shape and size of the metallic structure and determining if the desired metallic structure has been formed based on the analysis. In one embodiment, the scanning speed is between 1 mm/s and 10000 mm/s.

If it is determined that the desired metallic structure has been formed, the method 100 ends in step 110. On the other hand, if it is determined that the desired metallic structure has not been formed, the method 100 returns to step 102 and repeats steps 102 to 108 at a plurality of target spots in the three-dimensional space, until the desired metallic structure of the alloy is formed. In the present invention, the plurality of target spots is referred to any positions on the build platform or any positions on the half-finished metallic structure formed on the build platform. Preferably, the metallic structure is formed (e.g. printed) layer by layer.

As discussed above, in order to achieve a mixture with the plurality of primitive materials substantially uniformly distributed therein, the ratio of the primitive materials in the mixture or the flow rate or the mixture can be adjusted prior to or while supplying the mixture at the target spot. These quantities may be adjusted while supplying the mixture at a single target spot, or alternatively, they may be adjusted while supplying the mixture at different target spots in different cycles of the method 100.

In such embodiments, the properties of the mixture are allowed to be precisely controlled in substantially real-time, so that a desired metallic structure can be obtained, as will be discussed in detail below. The amount of primitive materials to be supplied and the flow rate of the mixture may be determined by an operator of the system based on visual inspection, or by a computing device of the system that is capable of, for example, analyzing the properties of the mixture and determining the required amount or flow rate based on the analysis.

A new target spot is selected in step 102 in each cycle. As described above, to fabricate each of the 2D layer of the 3D alloy structure, the dispenser may spread a layer of metal powders uniformly onto the platform or on top of the previously formed layers, and then the laser beam may move in the horizontal plane as set previously by the computer to print a two-dimensional (2D) pattern. After the necessary structure of the layer is formed, the platform may move downwardly (or instead the dispenser may move upwardly), and the abovementioned steps repeat until the all the individual layers are set so as to form the entire 3D alloy structure.

Alternatively, the dispenser moving unit may move the primitive material dispenser from a target spot of the previous cycle to another (e.g. adjacent) target spot in the 3D space that is selected in the current cycle, or the moving platform may move the portion of the metallic structure or the entire metallic structure from a target spot of the previous cycle to another target spot.

In one embodiment, the metallic structure manufactured using the method 100 includes a highly heterogeneous microstructure. The metallic structure has at least one printed layer with a thickness of 10 μm to 1000 μm, a yield strength of 600 MPa to 1700 MPa, a tensile strength of 800 MPa to 2000 MPa, a uniform elongation of 1% to 40%, and a porosity of up to 5%.

The examples set out below further illustrate the present invention. The preferred embodiments described above as well as examples given below represent preferred or exemplary embodiments and a skilled person will understand that the reference to those embodiments or examples is not intended to be limiting.

Referring to FIG. 2, there is shown the method of FIG. 1 being performed layer by layer according to one example embodiment. In this embodiment, the metallic structure of an alloy manufactured is made from Ti-6Al-4V alloy (referred to as Ti64 hereinafter) powder and 316L stainless steel (67.5Fe-18Cr-12Ni-2.5Mo) powder. Different properties of the resulting alloy (referred to as Ti64-316L hereinafter) are discussed below.

In this embodiment, selective laser melting (SLM) is utilized during additive manufacturing, with a laser beam 202 as a direct energy source of the system. A mixture 204 consisting of Ti64 powders (as indicated by the light circles) and 316L powders (as indicated by the dark circles) serves as the powder bed of SLM. The mixture 204 is melted by the laser beam 202, and then re-solidified onto the substrate 206 at different target spots and layer by layer.

Figure 3B:
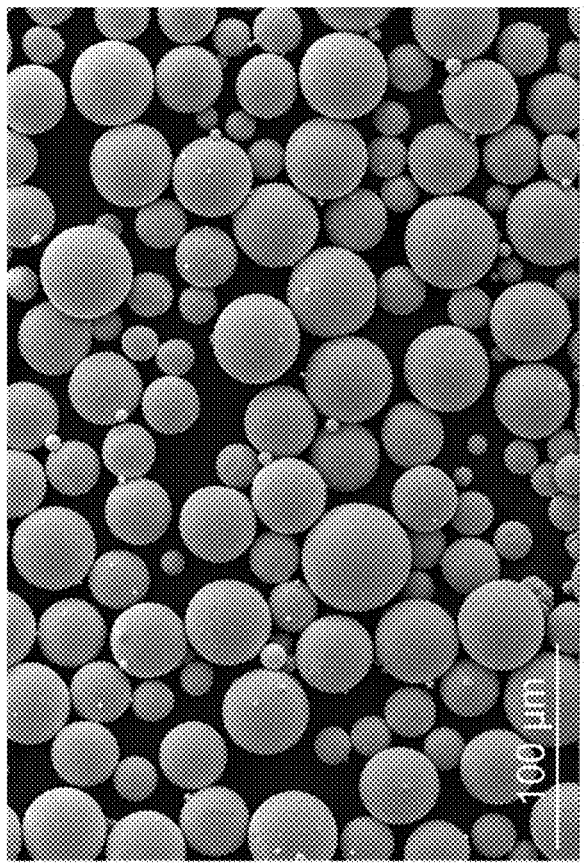
FIG. 3B is a scanning electron microscopy (SEM) image of primitive powders of Ti-6Al-4V.
Figure 3A:
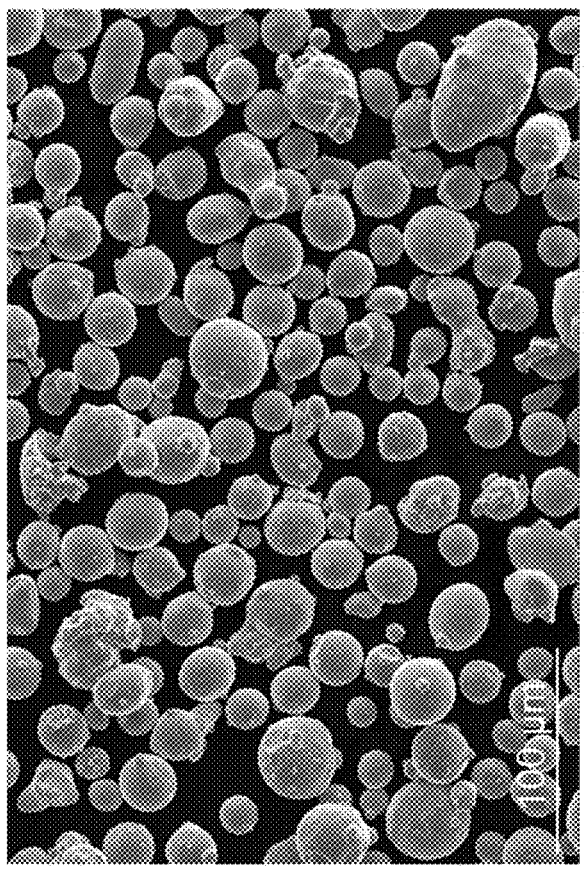
FIG. 3A is a scanning electron microscopy (SEM) image of primitive powders of 316L stainless steel.
Figure 4A:
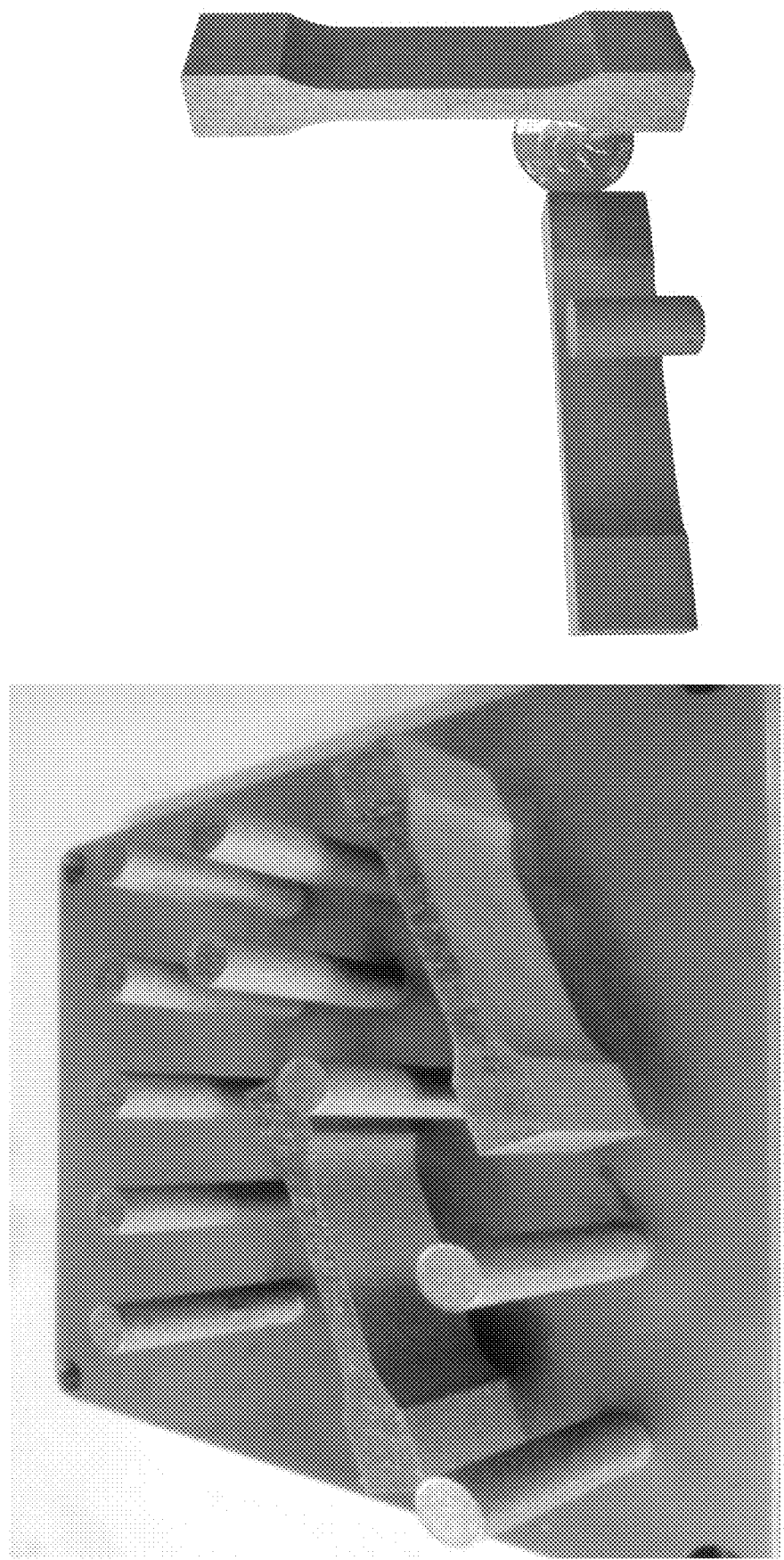
FIG. 4A is an image showing various sample structures manufactured using the method of FIG. 1.
Figure 4C:
FIG. 4C is an image showing the widths of the various sample structures of FIG. 4B.
Figure 4B:
FIG. 4B is an image showing the lengths of various sample structures manufactured using the method of FIG. 1.

FIGS. 3A and 3B show the scanning electron microscopy (SEM) images of the primitive powders of 316L stainless steel and Ti-6Al-4V, respectively, to form the Ti64-316L alloy. FIGS. 4A to 4C show various sample metallic structures formed using the method of FIG. 1, demonstrating that the method is capable of forming structures with different shapes and sizes.

Ti64 is known to have long suffered from the problem of large hazardous columnar grains and poor ductility during additive manufacturing. By using the method in the present invention based on in situ alloying of 316L stainless steel powders into Ti64 powders, highly heterogeneous microstructure with microscale concentration modulation within the melt pool regions throughout the alloy is produced, thereby achieving a fine grain size and best mechanical properties in additive manufactured Ti64 alloys, as will be discussed in detail below.

It is found that the microstructure heterogeneity is closely related to the microscale concentration modulation during in situ alloying. Generally, pre-alloyed powders are used for conventional additive manufacturing, which leads to a homogeneous chemical composition throughout the alloy. However, in the present invention, during in situ alloying, since different alloy powders are mechanically mixed, a heterogeneous chemical composition system can be produced by controlling the scan velocity and power of the energy source. For example, in an example where a laser beam is used for melting, the molten powders with different chemical compositions are mixed by a strong convection within the melt pool, and thus the composition of the mixture changes locally, leading to a heterogeneous chemical composition system.

FIGS. 5A to 5D show the microstructures of the as-printed Ti64-316L alloy at different length scales, demonstrating the concentration heterogeneity at the melt pool scale exists throughout the alloy.

Figure 5B:
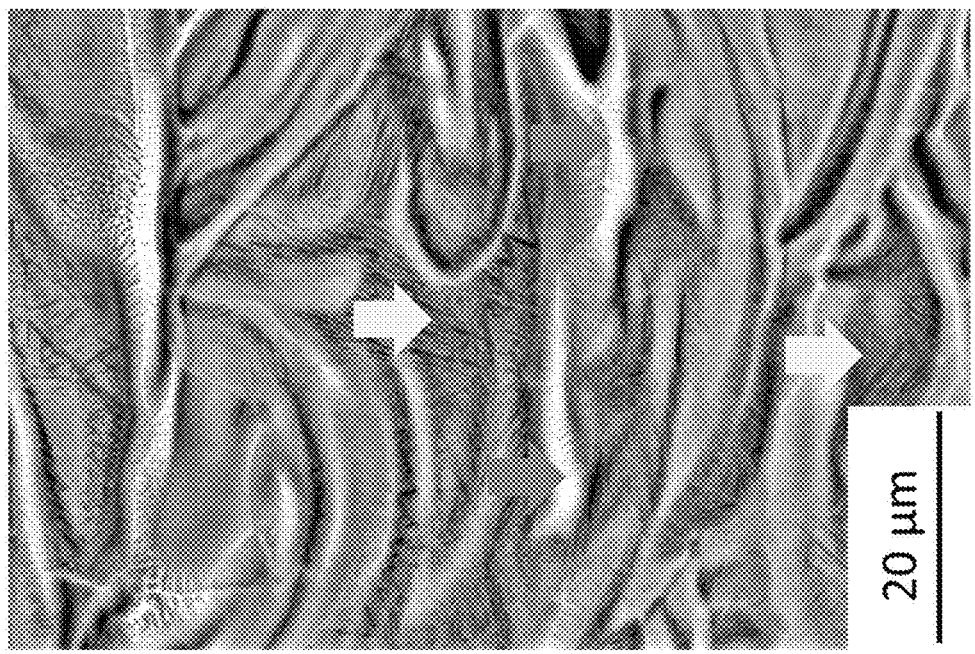
FIG. 5B is a higher magnification of the backscattered electron (BSE) image of FIG. 5A.
Figure 5A:
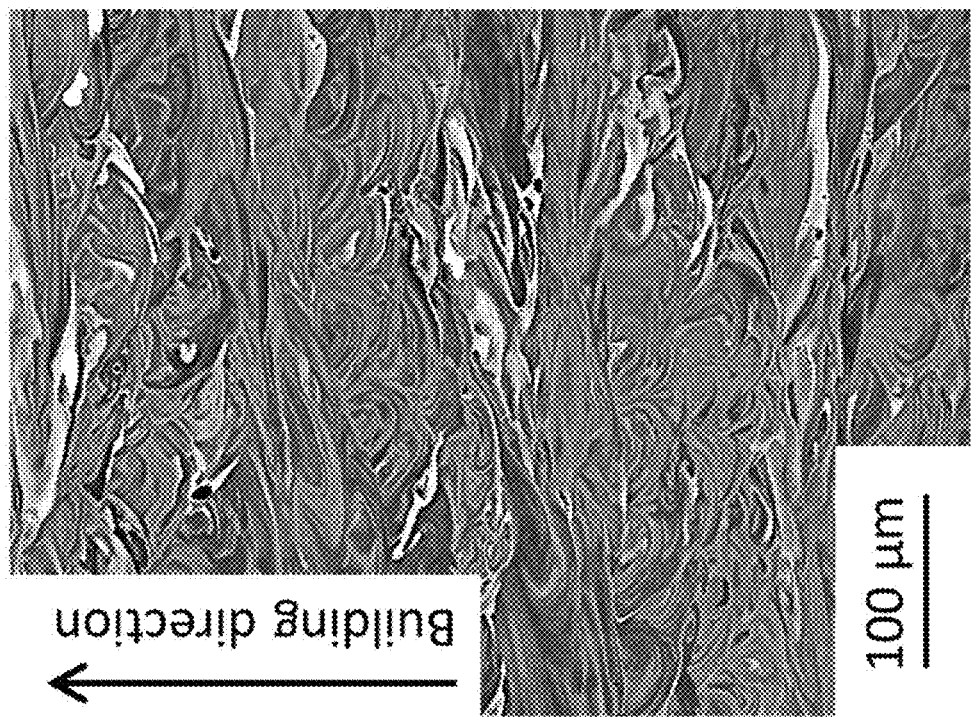
FIG. 5A is a side view cross sectional backscattered electron (BSE) image of a Ti64-316L alloy.

FIG. 5A is the backscattered electron (BSE) image from the side view cross-section of the as-printed Ti64-316L alloy, showing the shape of the frozen melt pool without columnar β grains at ~100 μm. Brighter regions are enriched in heavy elements (Fe, Cr, Ni, Mo in 316L) and darker regions are enriched in light elements (Ti, Al, V in Ti64). Different from the large columnar grains alongside the build direction in conventional titanium alloys, the Ti64-316L alloy shows a unique lava-like microstructure with clear deposition layers and without noticeable cracks at all. The shape of the melt pool is frozen to room temperature and solidified lavas are preserved in the as-printed alloy, indicating an extremely fast solidification process.

Figure 5C:
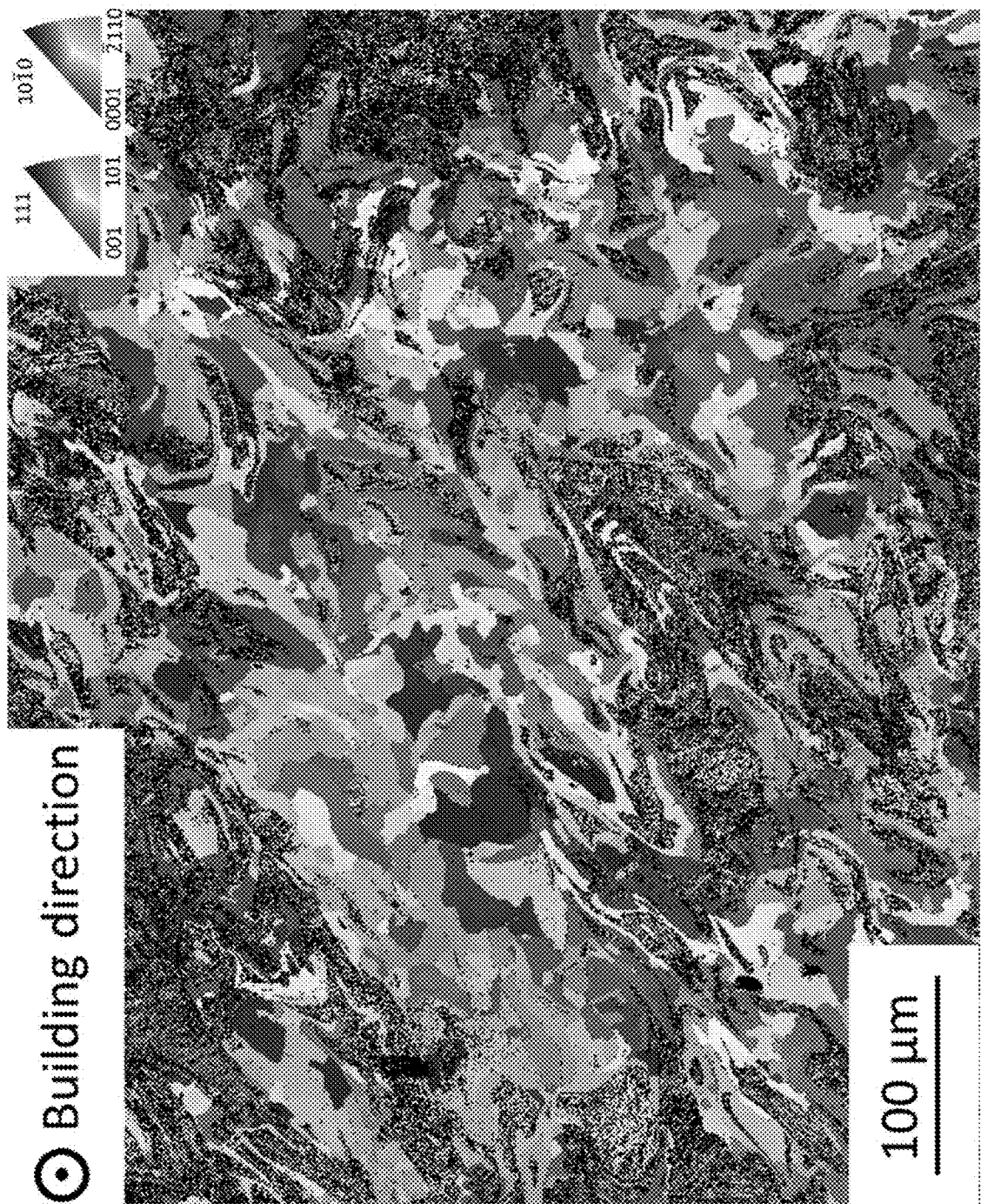
FIG. 5C is an electron backscatter diffraction (EBSD) inverse pole figure (IPF) map of a Ti64-316L alloy.

FIG. 5B is a higher magnification BSE image showing a clearer lava-like heterogeneous microstructure at ~20 μm. Within the melt pool regions, the coexistence of acicular (α') martensite (as indicated with white arrows) is observed as expected. Surprisingly, besides the α' martensite, there also exists ultrafine β grains with solidification of a cellular structure with fine cellular spacing (as indicated with black arrows), which is not observed in typical as-printed Ti64 alloy. As shown in FIG. 5C, this highly heterogeneous spatial distribution of the β and α' phases is also confirmed by electron backscatter diffraction (EBSD) inverse pole figure (IPF) map. The β phase forms bulk grains while α' martensite is acicular in shape.

Figure 5E:
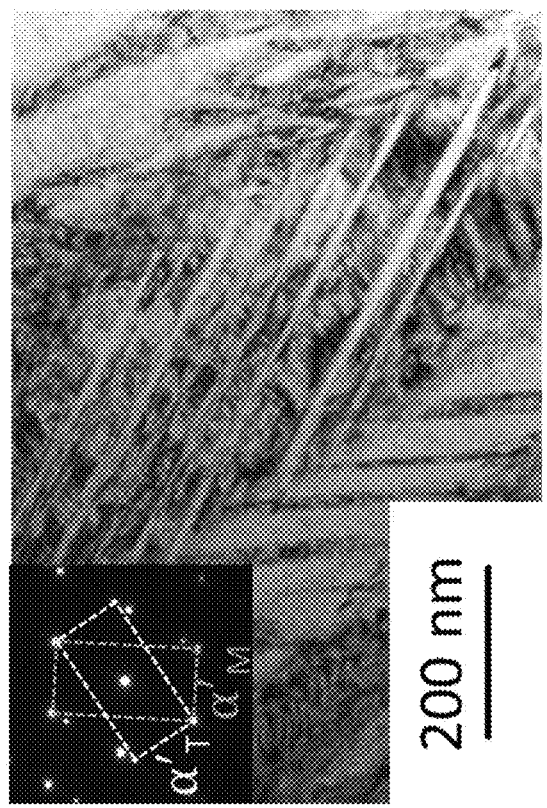
FIG. 5E is a higher magnification of the transmission electron microscopy (TEM) bright-field image of FIG. 5D.
Figure 5D:
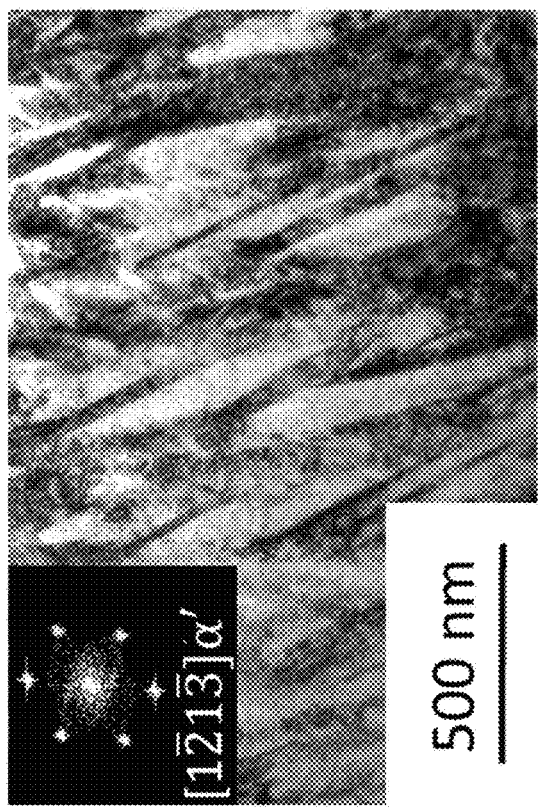
FIG. 5D is a transmission electron microscopy (TEM) bright-field image of a Ti64-316L alloy.
Figure 6A:
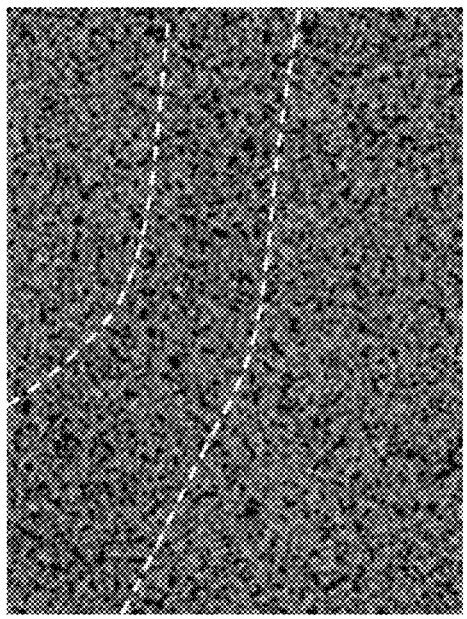
FIG. 6A is a scanning electron microscopy (SEM) image of a Ti64-316L alloy.
Figure 6B:
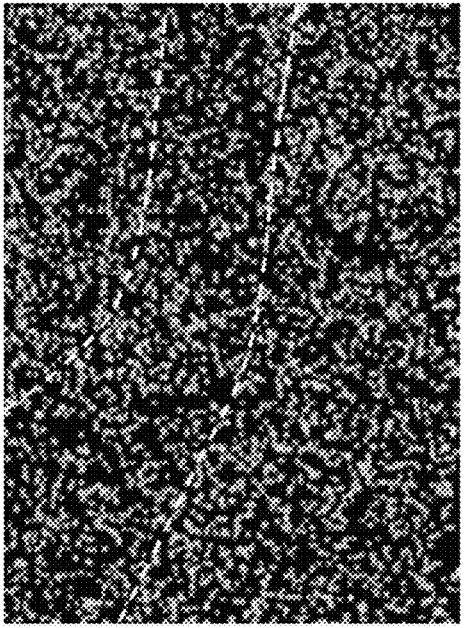
FIG. 6B is a scanning electron microscopy-energy dispersive x-ray spectroscopy (SEM-EDS) image of Ti in the Ti64-316L alloy of FIG. 6A.
Figure 6C:
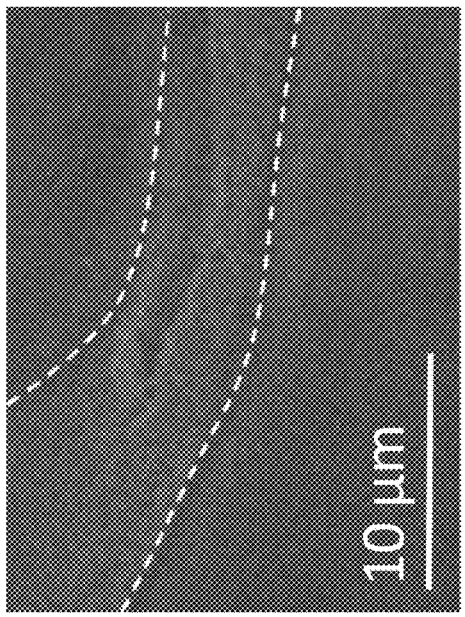
FIG. 6C is a scanning electron microscopy-energy dispersive x-ray spectroscopy (SEM-EDS) image of Al in the Ti64-316L alloy of FIG. 6A.
Figure 6D:
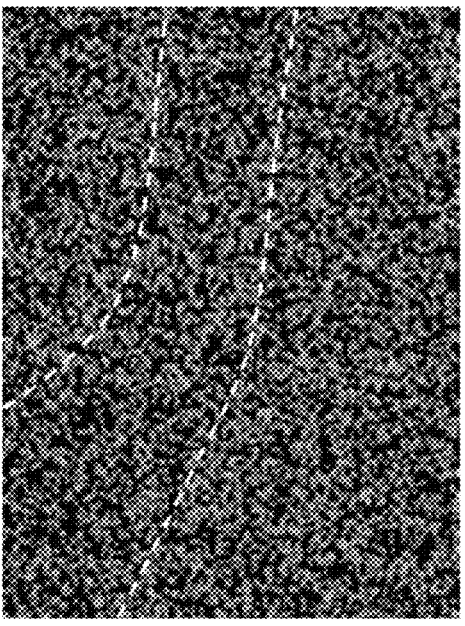
FIG. 6D is a scanning electron microscopy-energy dispersive x-ray spectroscopy (SEM-EDS) image of V in the Ti64-316L alloy of FIG. 6A.
Figure 6F:
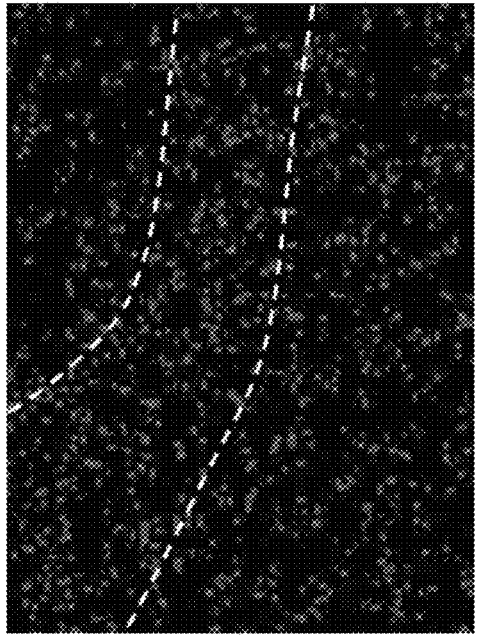
FIG. 6F is a scanning electron microscopy-energy dispersive x-ray spectroscopy (SEM-EDS) image of Cr in the Ti64-316L alloy of FIG. 6A.
Figure 6H:
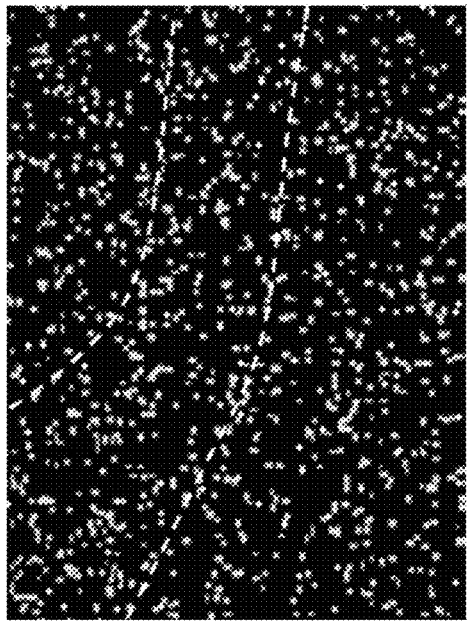
FIG. 6H is a scanning electron microscopy-energy dispersive x-ray spectroscopy (SEM-EDS) image of Mo in the Ti64-316L alloy of FIG. 6A.
Figure 6E:
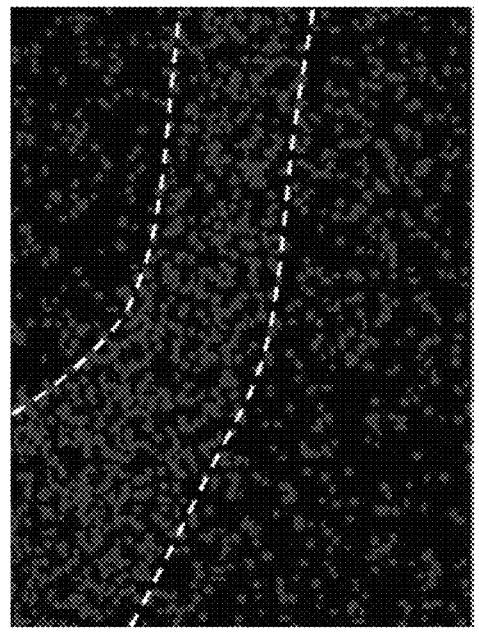
FIG. 6E is a scanning electron microscopy-energy dispersive x-ray spectroscopy (SEM-EDS) image of Fe in the Ti64-316L alloy of FIG. 6A.
Figure 6G:
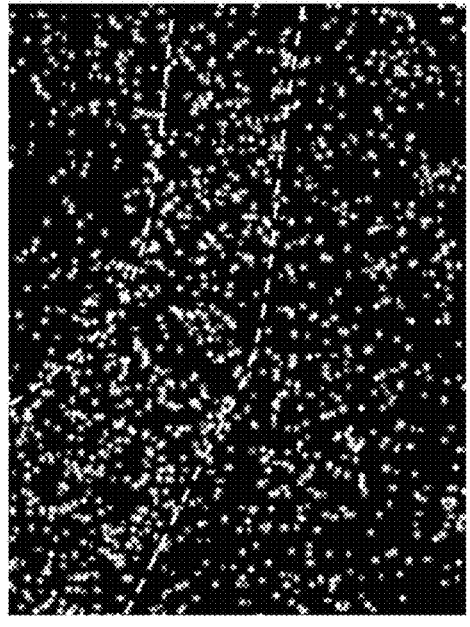
FIG. 6G is a scanning electron microscopy-energy dispersive x-ray spectroscopy (SEM-EDS) image of Ni in the Ti64-316L alloy of FIG. 6A.
Figure 7B:
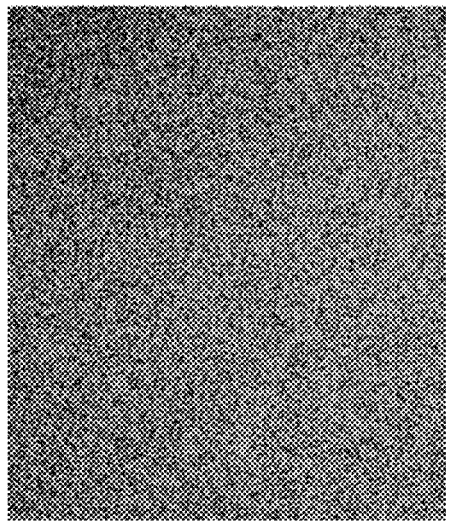
FIG. 7B is a transmission electron microscopy-energy dispersive x-ray spectroscopy (TEM-EDS) image of Ti in the α' phase of a Ti64-316L alloy.
Figure 7D:
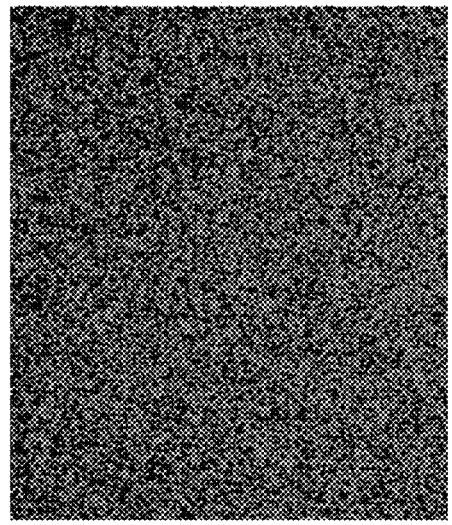
FIG. 7D is a transmission electron microscopy-energy dispersive x-ray spectroscopy (TEM-EDS) image of V the α' phase of a Ti64-316L alloy.
Figure 7A:
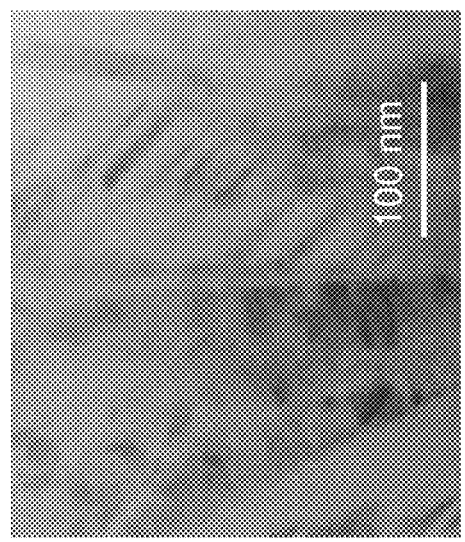
FIG. 7A is a transmission electron microscopy (TEM) image of the α' phase of a Ti64-316L alloy.
Figure 7C:
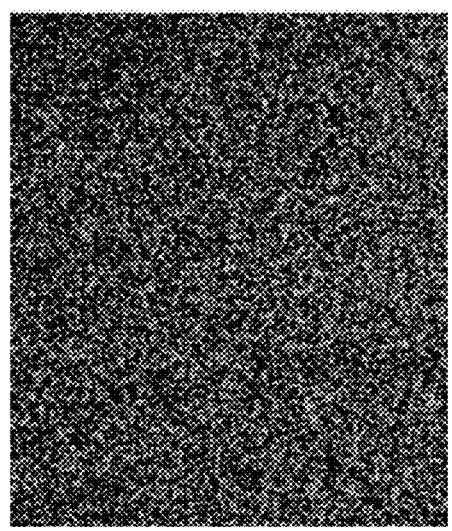
FIG. 7C is a transmission electron microscopy-energy dispersive x-ray spectroscopy (TEM-EDS) image of Al in the α' phase of a Ti64-316L alloy.
Figure 7F:
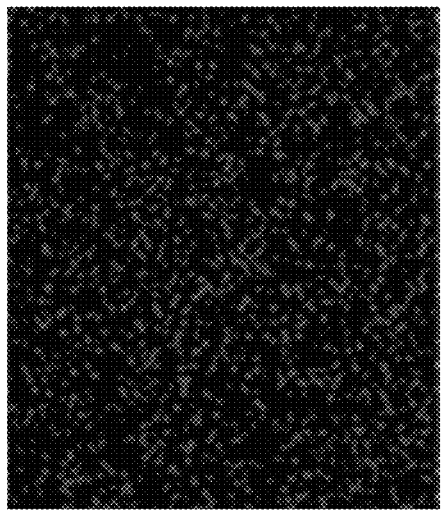
FIG. 7F is a transmission electron microscopy-energy dispersive x-ray spectroscopy (TEM-EDS) image of Cr in the α' phase of a Ti64-316L alloy.
Figure 7H:
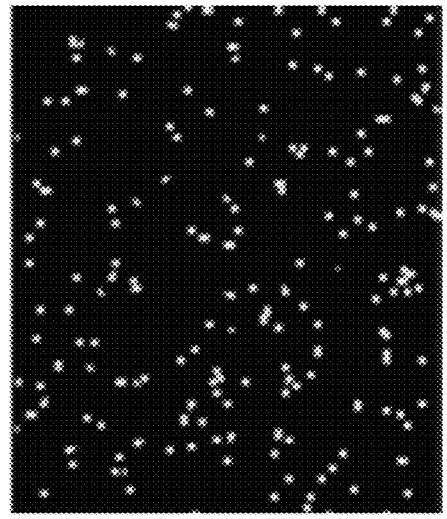
FIG. 7H is a transmission electron microscopy-energy dispersive x-ray spectroscopy (TEM-EDS) image of Mo in the α' phase of a Ti64-316L alloy.
Figure 7E:
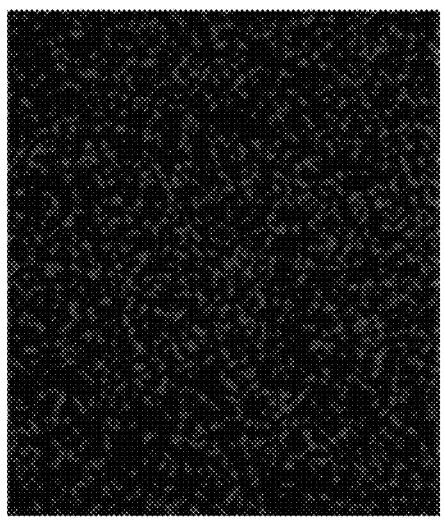
FIG. 7E is a transmission electron microscopy-energy dispersive x-ray spectroscopy (TEM-EDS) image of Fe in the α' phase of a Ti64-316L alloy.
Figure 7G:
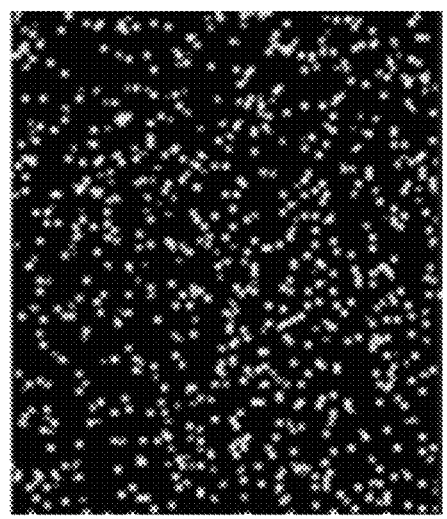
FIG. 7G is a transmission electron microscopy-energy dispersive x-ray spectroscopy (TEM-EDS) image of Ni in the α' phase of a Ti64-316L alloy.
Figure 8B:
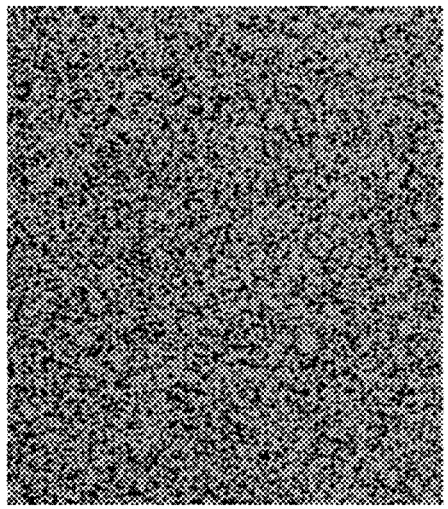
FIG. 8B is a transmission electron microscopy-energy dispersive x-ray spectroscopy (TEM-EDS) image of Ti in the β phase of a Ti64-316L alloy.
Figure 8D:
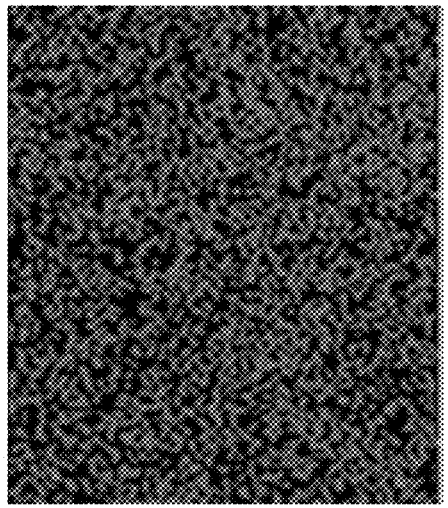
FIG. 8D is a transmission electron microscopy-energy dispersive x-ray spectroscopy (TEM-EDS) image of V the β phase of a Ti64-316L alloy.
Figure 8A:
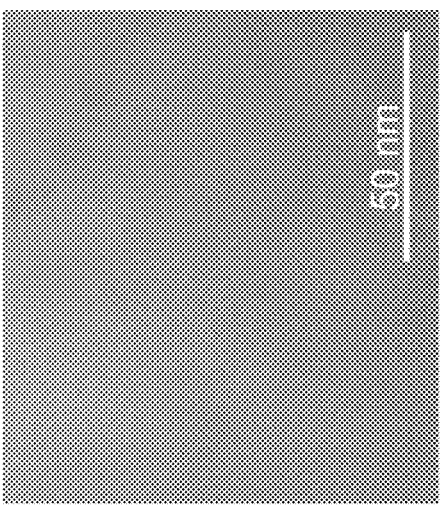
FIG. 8A is a transmission electron microscopy (TEM) image of the β phase of a Ti64-316L alloy.
Figure 8C:
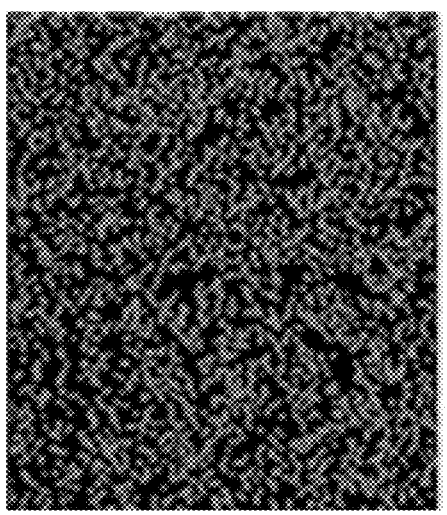
FIG. 8C is a transmission electron microscopy-energy dispersive x-ray spectroscopy (TEM-EDS) image of Al in the β phase of a Ti64-316L alloy.
Figure 8F:
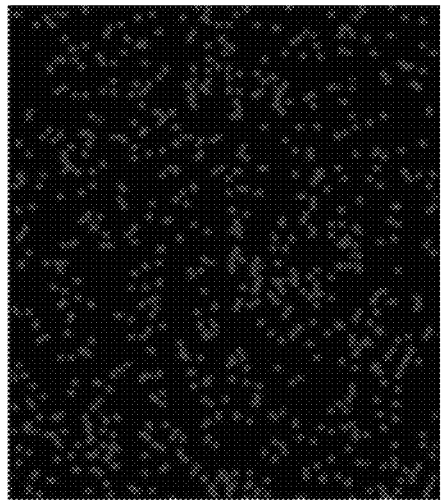
FIG. 8F is a transmission electron microscopy-energy dispersive x-ray spectroscopy (TEM-EDS) image of Cr in the β phase of a Ti64-316L alloy.
Figure 8H:
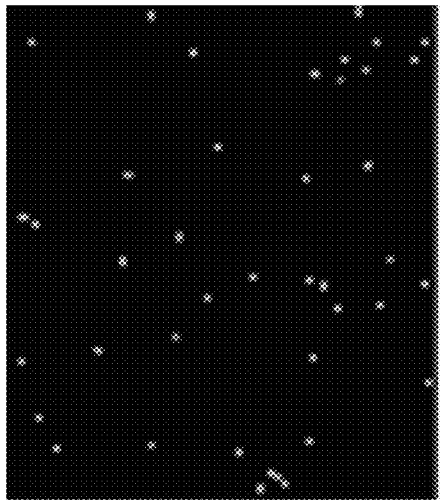
FIG. 8H is a transmission electron microscopy-energy dispersive x-ray spectroscopy (TEM-EDS) image of Mo in the β phase of a Ti64-316L alloy.
Figure 8E:
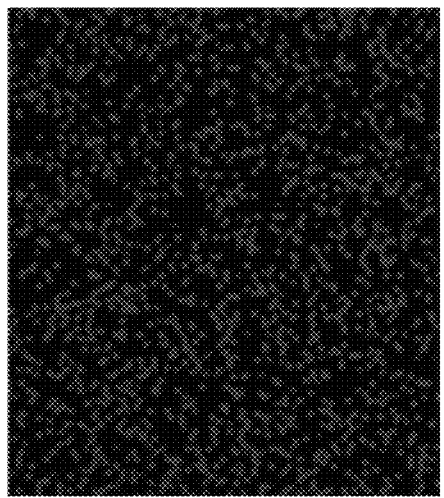
FIG. 8E is a transmission electron microscopy-energy dispersive x-ray spectroscopy (TEM-EDS) image of Fe in the β phase of a Ti64-316L alloy.
Figure 8G:
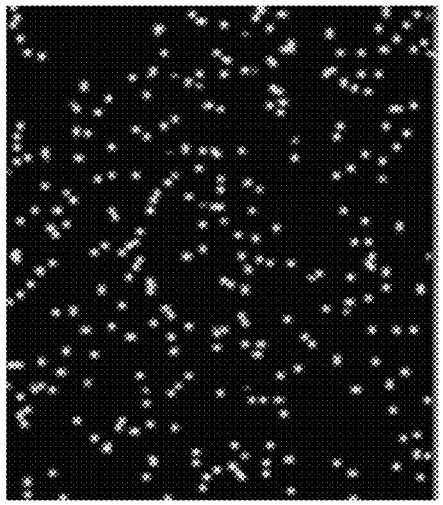
FIG. 8G is a transmission electron microscopy-energy dispersive x-ray spectroscopy (TEM-EDS) image of Ni in the β phase of a Ti64-316L alloy.
Figure 9A:
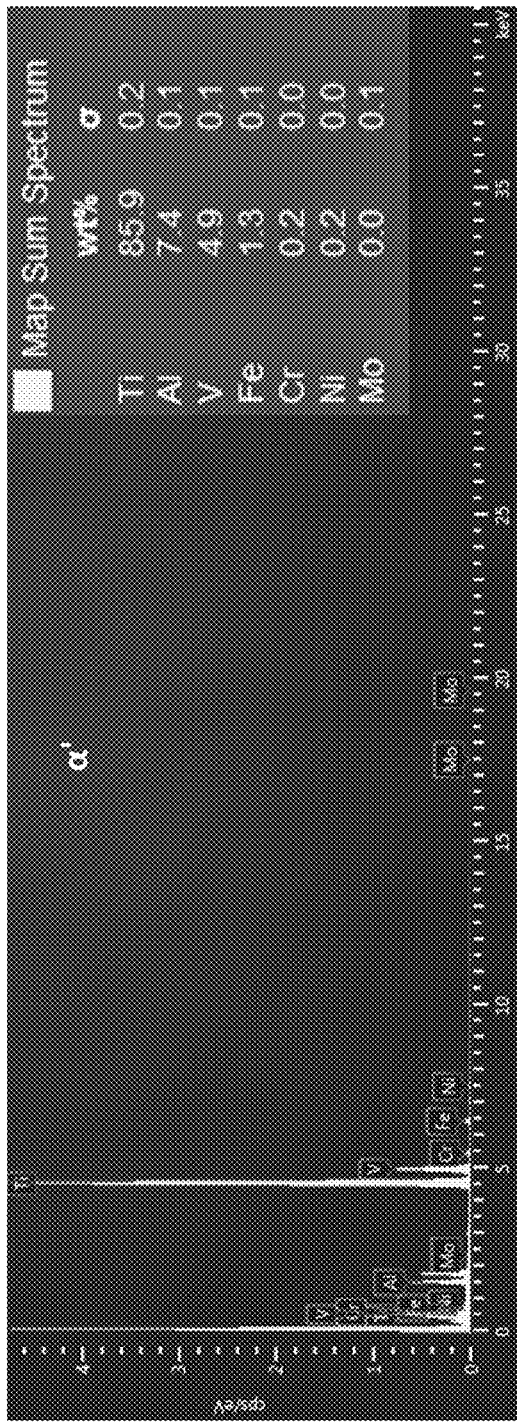
FIG. 9A is an energy-dispersive X-ray spectroscopy (EDS) graph of the α' phase of a Ti64-316L alloy.
Figure 9B:
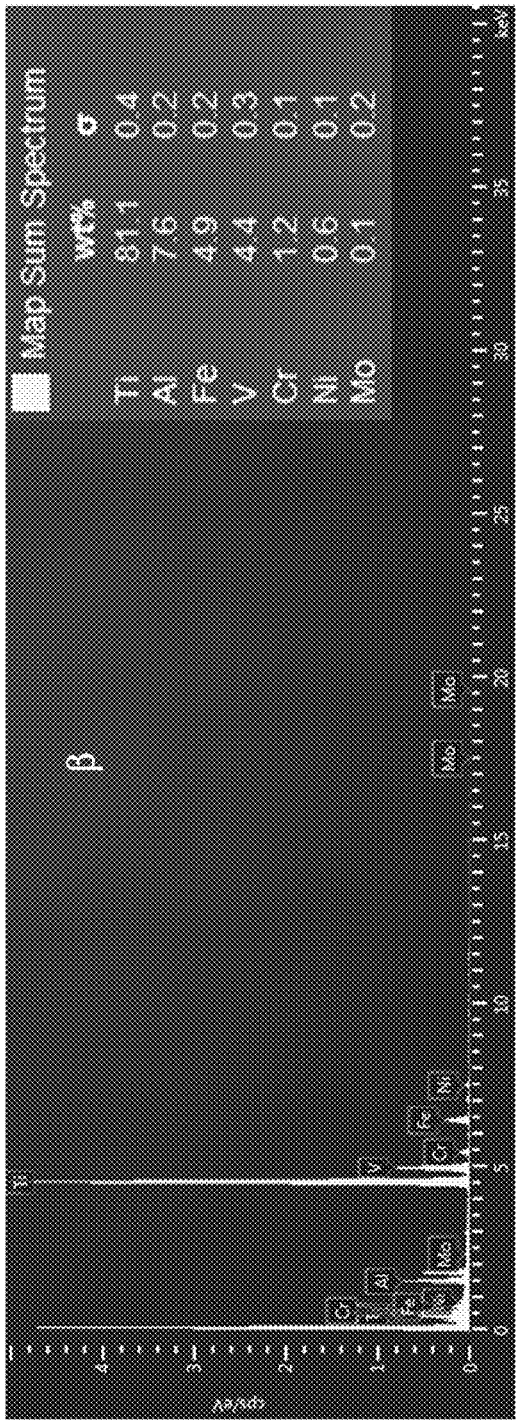
FIG. 9B is an energy-dispersive X-ray spectroscopy (EDS) graph of the β phase of a Ti64-316L alloy.

FIGS. 5D and 5E are transmission electron microscopy (TEM) bright-field images showing the fine α' martensite with a width of <100 nm and the ultrafine twin structure with a twin spacing of ~20 nm, respectively.

FIGS. 6A to 6H are scanning electron microscopy-energy dispersive x-ray spectroscopy (SEM-EDS) maps showing the depletion of Ti, Al, V and enrichment of Fe, Cr, Ni elements in one of the swirls within the melt pool. The transmission electron microscopy-energy dispersive x-ray spectroscopy (TEM-EDS) images (FIGS. 7A to 9B) show that the α' phase regions has a lower 316L concentration than that of the β phase.

Figure 10:
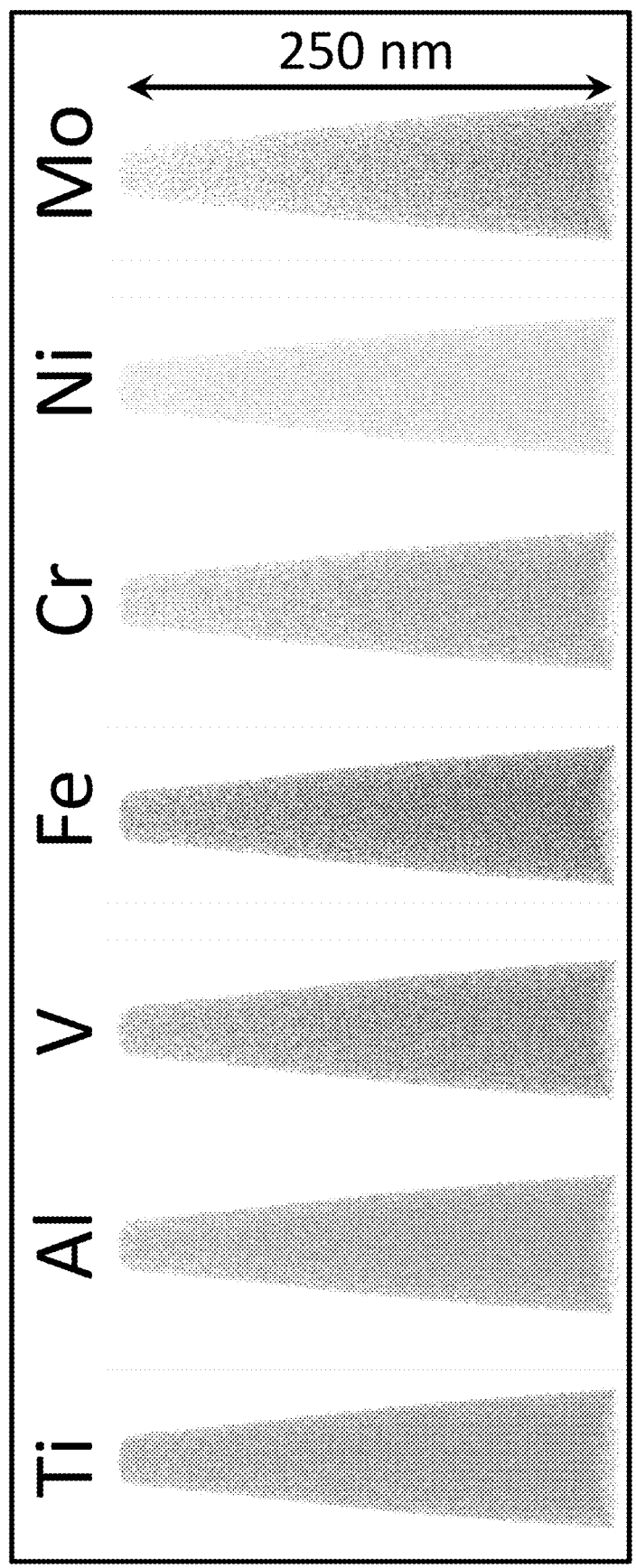
FIG. 10 is a 3D reconstruction map of an atom probe tomography (APT) needle from the cellular regions circled in FIG. 5A.

FIG. 10 is a 3D reconstruction map of an atom probe tomography (APT) needle from the dendrite area circled in FIG. 5A, showing the enrichment of Fe, Cr, Ni, Mo elements within the local area. The precise composition is measured to be Ti64-9.925 wt. % 316L by APT. All these evidences suggest that each site of the alloy has its unique composition under concentration modulation during in situ alloying (Table 1).

TABLE 1

Elemental analysis of each site of the as-printed Ti64-316L alloy.

| Element (wt %) | Ti | Al | V | Fe | Cr | Ni | Mo | Sum of Ti64 | Sum of 316L |
|---|---|---|---|---|---|---|---|---|---|
| Average (by SEM-EDS) | 86.59 | 5.59 | 3.50 | 2.96 | 0.79 | 0.45 | 0.12 | 95.68 | 4.32 |
| Needle at cellular center (by 3D-APT) | 80.342 | 5.812 | 3.923 | 6.354 | 1.730 | 1.550 | 0.289 | 90.077 | 9.925 |
| Needle at a?region (by 3D-APT) | 88.564 | 6.008 | 4.115 | 0.901 | 0.280 | 0.120 | 0.010 | 98.688 | 1.311 |
| β phase (by TEM-EDS) | 81.13 | 7.65 | 4.40 | 4.88 | 1.18 | 0.64 | 0.11 | 93.18 | 6.81 |
| a' phase (by TEM-EDS) | 85.94 | 7.39 | 4.90 | 1.29 | 0.23 | 0.21 | 0.05 | 88.23 | 1.78 |

Figure 11:
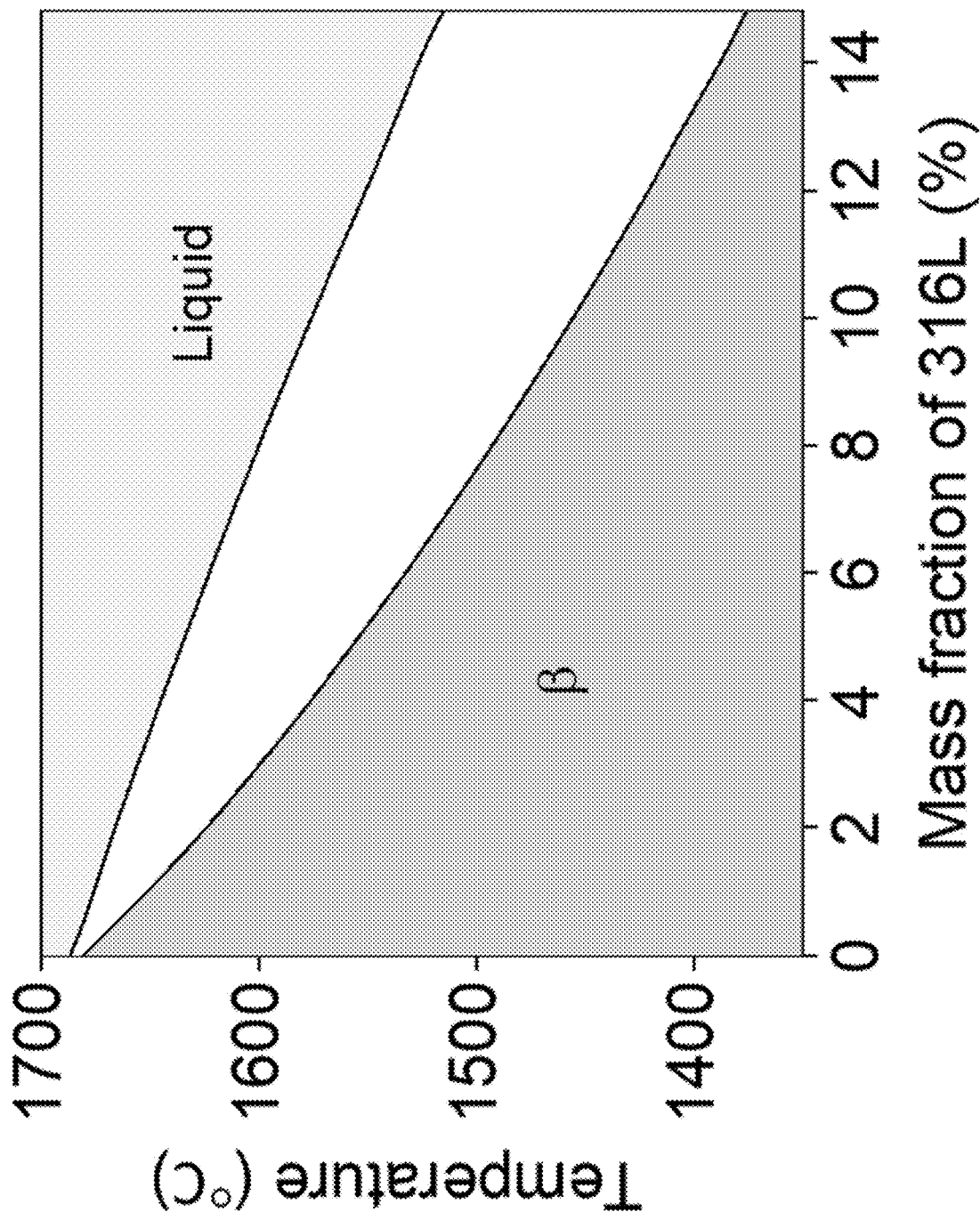
FIG. 11 is a Pseudo-binary Ti64-316L phase diagram of a Ti64-316L alloy calculated by the Thermo-Calc software.
Figure 12:
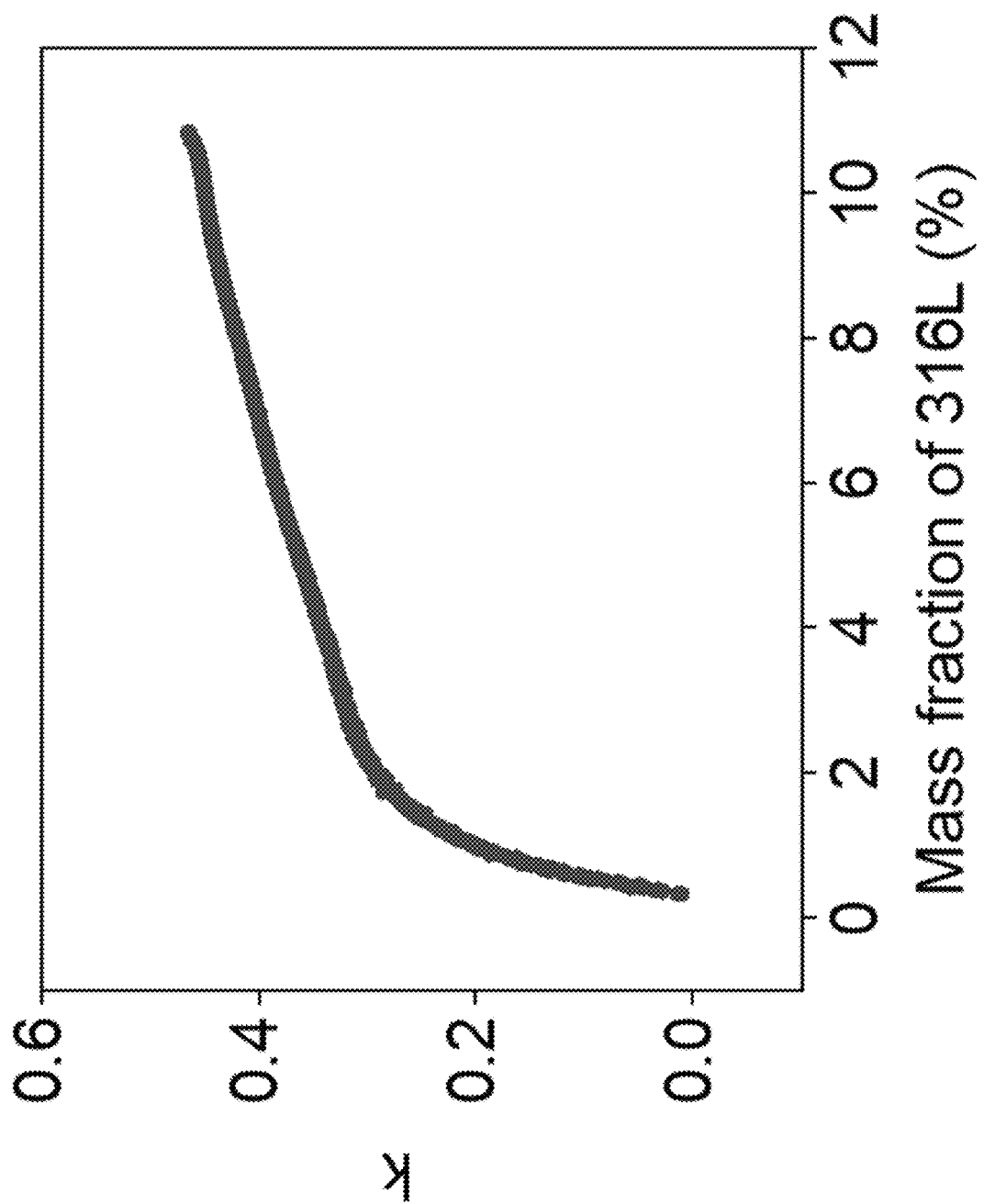
FIG. 12 is a graph showing calculated solute partition coefficient k as a function of 316L content.
Figure 13:
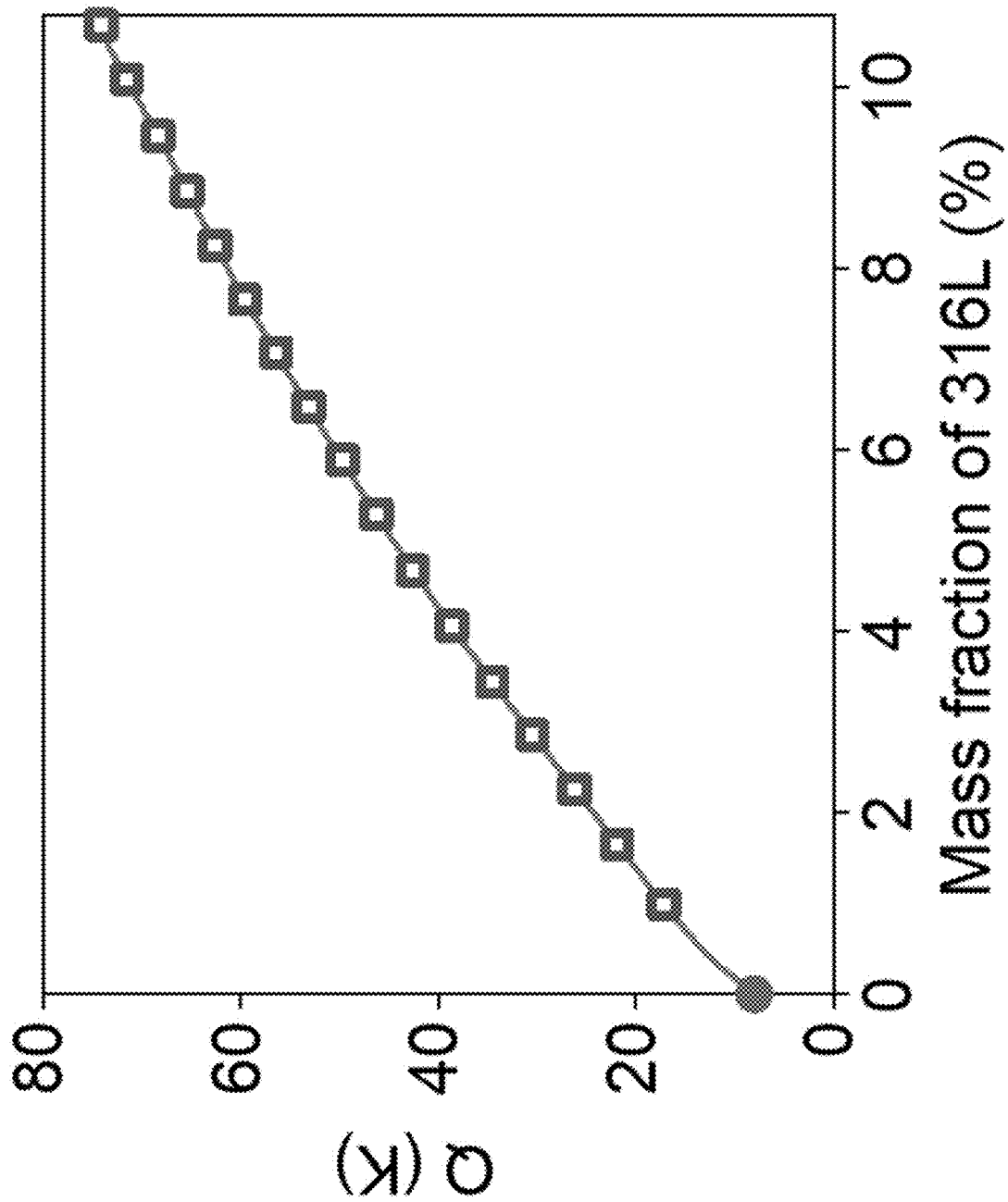
FIG. 13 is a graph showing calculated growth restriction factor Q as a function of 316L content.

One direct impact of microscale concentration modulation is grain refinement. With reference to FIGS. 11 to 13, a Pseudo-binary Ti64-316L phase diagram of a Ti64-316L alloy is calculated by the Thermo-Calc software, and a solute partition coefficient k and a growth restriction factor Q as a function of 316L content are obtained based on the calculated phase diagram. The grain size of the as-printed alloy is determined by its constitutional supercooling capacity, which is closely related to the growth restriction factor Q. The result demonstrates that, based on the calculated phase diagram, a strong dependence of the Q value on the mass fraction of 316L is obtained. Given the concentration heterogeneity, the Q value varies spatially. For instance, the center of the dendrite region has a high Q value of 101K, which is about thirteen times higher than that of the Ti64 alloy (Q≈8K). Thus, the 316L-rich regions have a higher supercooling capacity that results in more nuclei in front of the solid-liquid interface and much finer grain structure.

Figure 14:
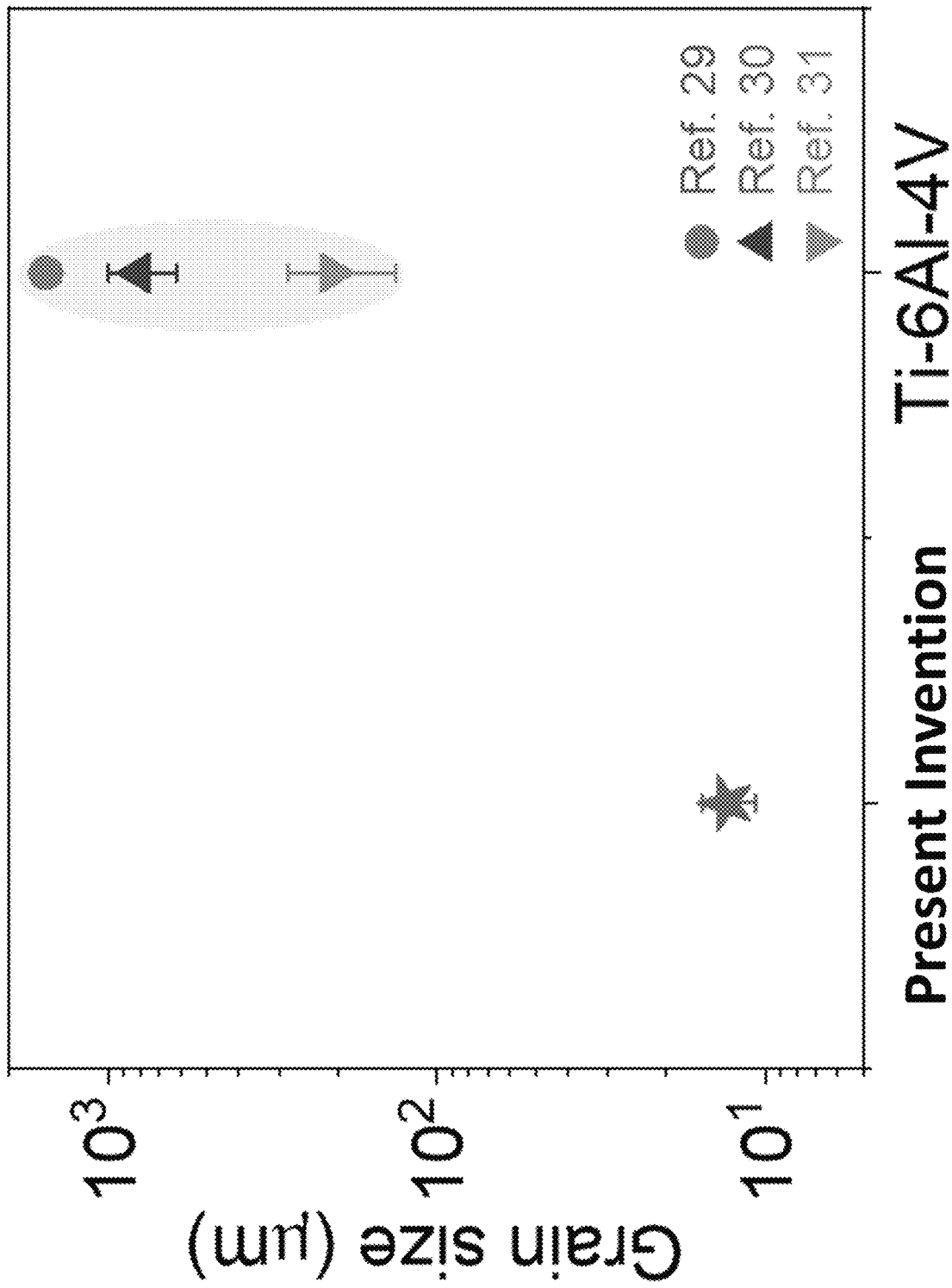
FIG. 14 is a graph showing the comparison of average grain size between a Ti64 alloy and a Ti64-316L alloy.

FIG. 14 shows the comparison of average grain size between the as-printed Ti64 alloy and the Ti64-316L alloy produced using the method 100 in the present invention, where the grain size of the Ti64-316L alloy is measured by the linear intercept technique from the EBSD band contrast image (FIG. 5C) in order to reduce measurement errors. According to the EBSD image, the average grain size of the as-printed Ti64-316L alloy is measured as 13.09 pm. Comparing to other additively manufactured Ti64 alloys having a large columnar grain over hundreds of micrometers, the Ti64-316L alloy in the present invention has the finest grain structure. The average grain size of the Ti64 alloy is refined by 1~2 orders of magnitude once a small amount of 316L powders is added.

Figures 15A, 15B:
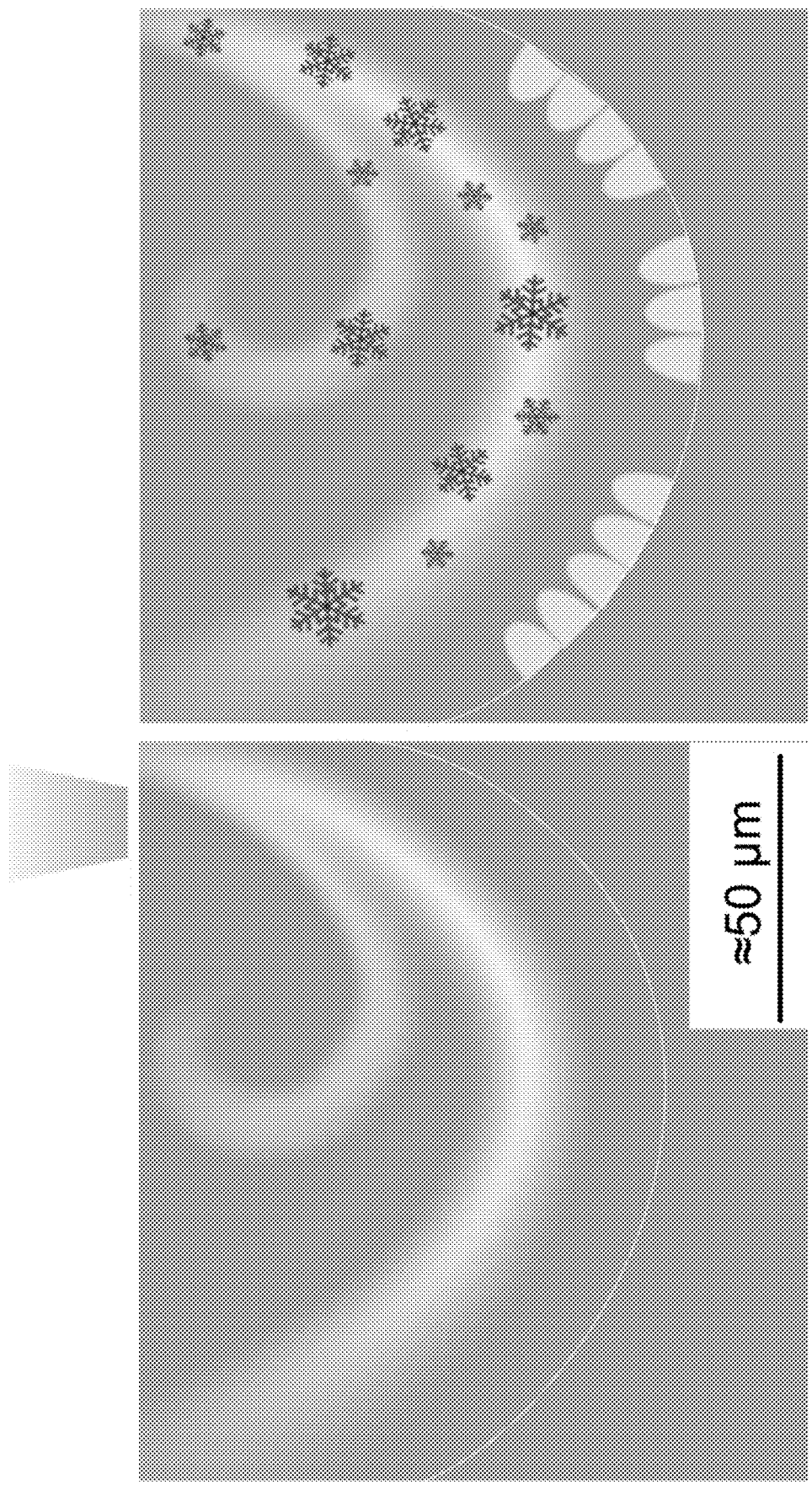
FIG. 15A is a schematic diagram illustrating the mixture during the step of melting in the method of FIG. 2.
FIG. 15B is a schematic diagram illustrating the mixture during the step of solidifying in the method of FIG. 2.

With reference to FIG. 15A to 15D, there is shown the effect of microscale concentration modulation during in situ alloying on the subsequent solidification. FIG. 15A shows an inadequate mixture during the step of melting (e.g. during laser exposure). Because of a short exposure time to laser, the molten Ti64 and 316L powders are insufficiently mixed by convection, thus producing a local microscale concentration modulation. FIG. 15B shows the mixture capable of promoting nucleation of equiaxed grains during the step of solidifying. When the laser is removed for solidification, the swirls having a higher 316L content promote more nucleation ahead of solid-liquid interface due to a higher Q value.

Figure 15D:
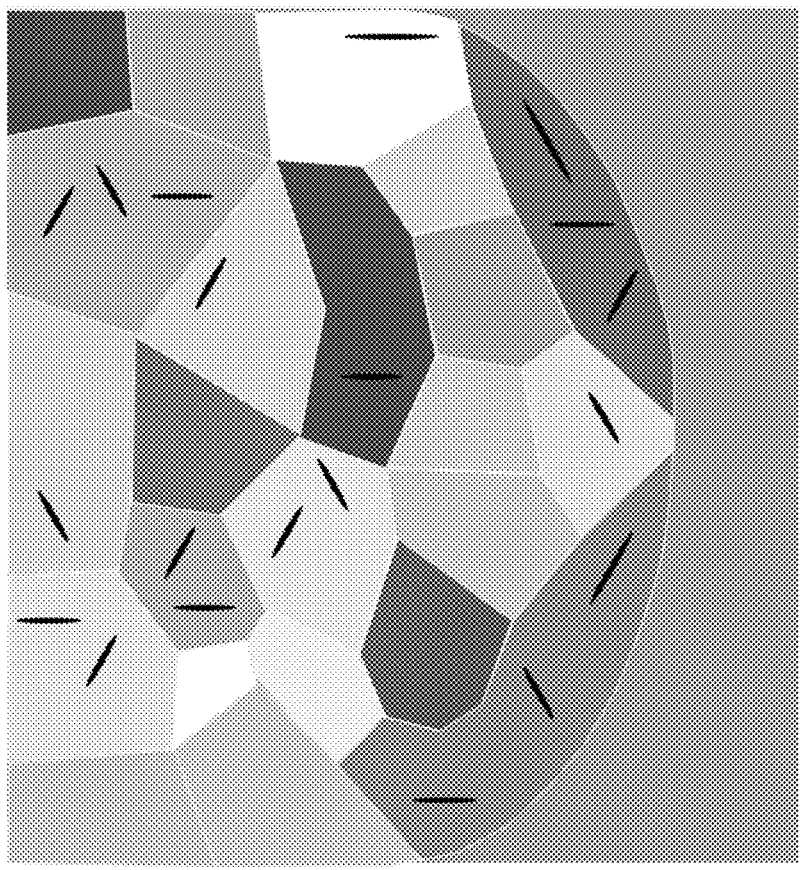
FIG. 15D is a schematic diagram illustrating a heterogeneous dual-phase structure in a Ti64-316L alloy.
Figure 15C:
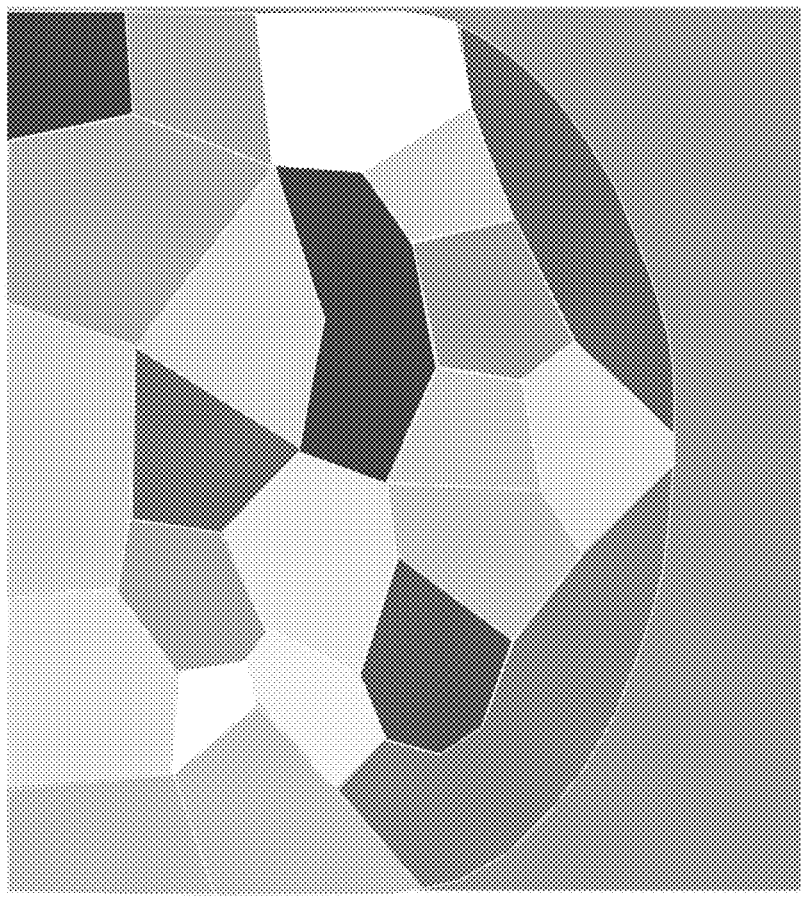
FIG. 15C is a schematic diagram illustrating an ultrafine-grained formed in a Ti64-316L alloy.
Figure 16B:
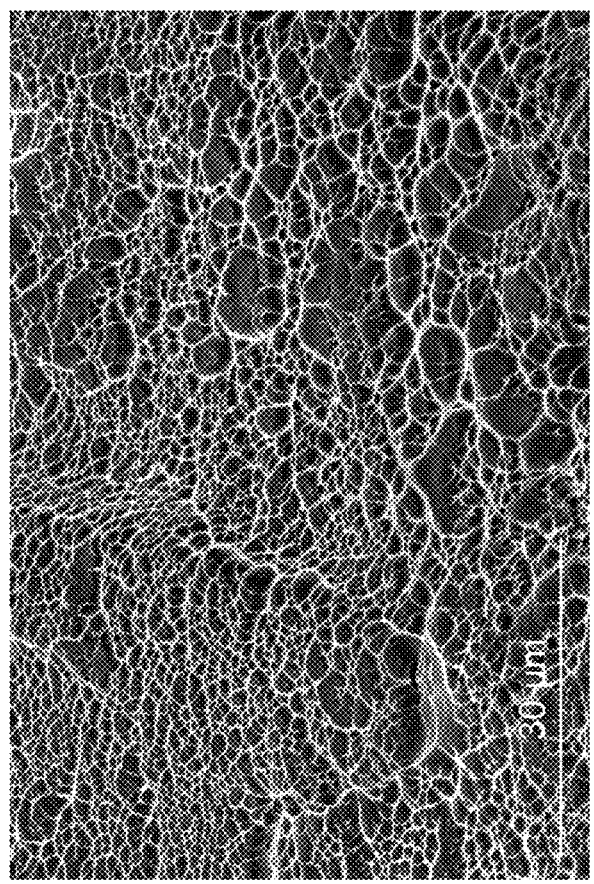
FIG. 16B is a higher magnification of the fracture surface image of FIG. 16A.
Figure 16A:
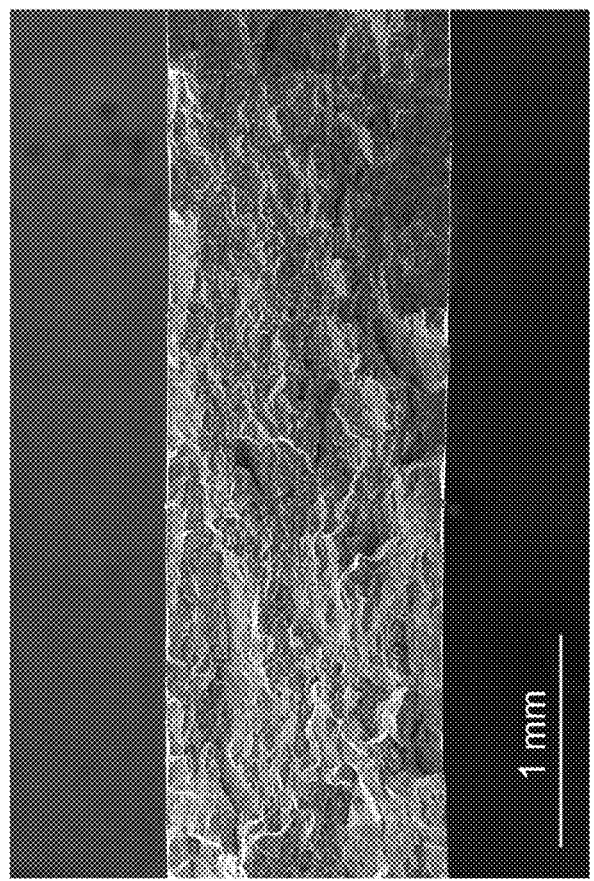
FIG. 16A is a fracture surface image showing the fracture surface of a Ti64-316L alloy.

FIG. 15C shows a lava-like ultrafine-grained microstructure formed as the growth of columnar grains is interrupted by the heterogeneous nuclei. FIG. 15D shows a heterogeneous dual-phase structure created by the martensitic transformation and twinning of acicular α' within the 316L-lean regions. FIGS. 16A and 16B show the fracture surface of the as-printed Ti64-316L alloy showing mainly dimple patterns.

Figure 17:
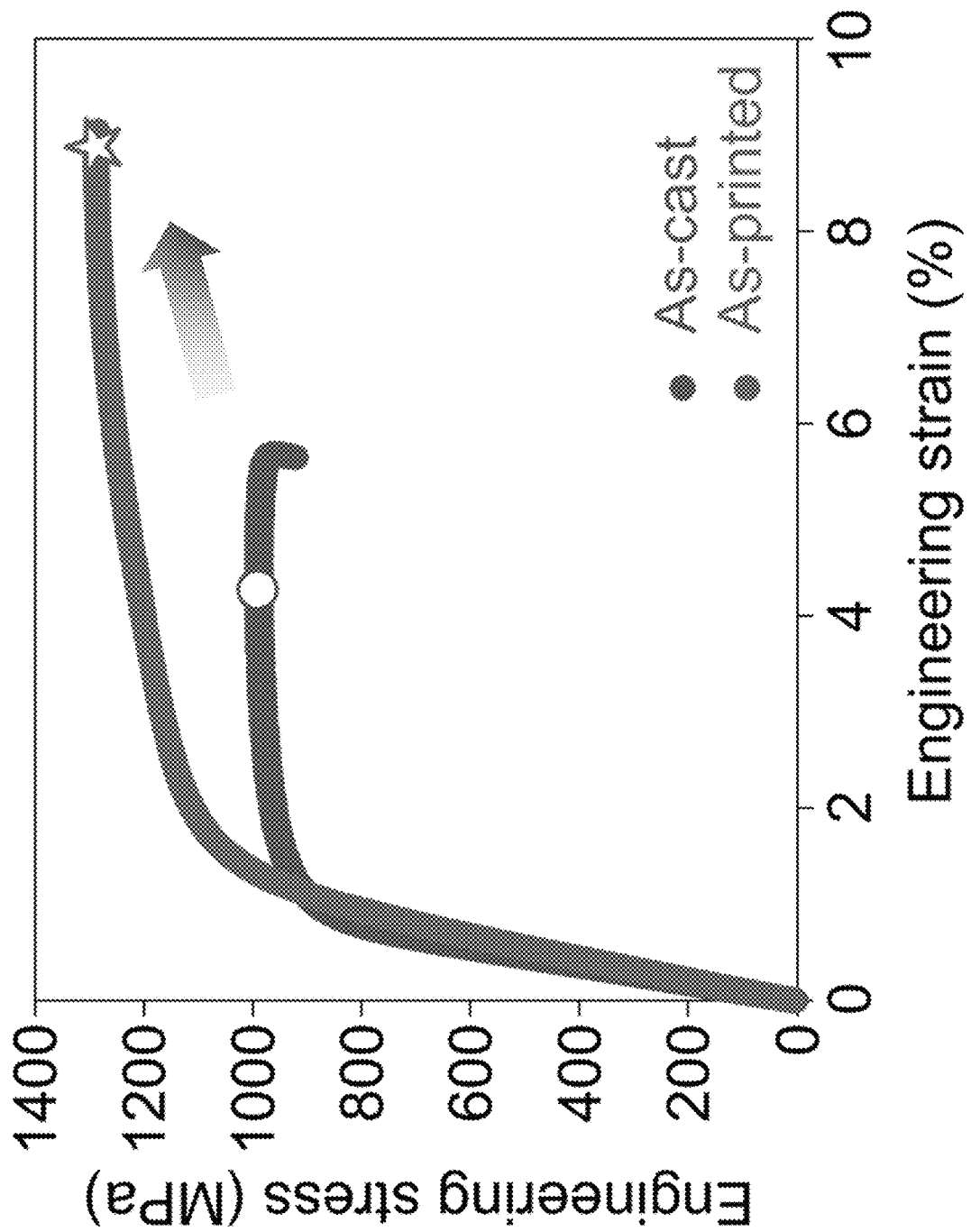
FIG. 17 is a graph showing the comparison of engineering stress-strain curve between an as-printed Ti64-316L alloy and an as-cast Ti64 alloy.

Different mechanical properties (Table 2) of the as-printed Ti64-316L alloy are evaluated. With reference to FIG. 17, in a tensile test performed on the as-printed Ti64-316L alloy, it is demonstrated that, comparing to the as-cast Ti64 alloy, the ultimate tensile strength ($\sigma_{UTS}$) of the as-printed Ti64-316L alloy increases by 30% (from 993 MPa to 1293 MPa) and the ductility as the uniform elongation ($\varepsilon_u$) increases by 108% (from 4.3% to 8.94%). The ultimate tensile strength is marked by the big symbols (star and sphere) in the curves.

which is advantageous in industrial applications where a large safety threshold is needed before fracture.

In Ti64 alloys, no matter conventionally fabricated or additively manufactured, the lacking of a significant work-hardening capacity is always reported. To date, advanced SLM-fabricated Ti64 can achieve the ultimate tensile strength to the level of ~1.2 GPa. However, an early onset of plastic instability is usually observed, leading to a catastrophic failure before ε<4%. This is essentially because of a large fraction of hcp phases (α' martensite or α precipitate) within the alloy. Generally, the β phase volume fraction of as-printed or heat-treated Ti64 alloy ranges from 0~7%.

With reference to FIGS. 19A to 19D, there is demonstrated the microstructure evolution prior to and after the tensile test. In the Ti64-316L alloy in the present invention, the β phase fraction reaches as high as 60.1% (FIGS. 19A and 19B), which is 10 times higher than the as-printed or heat-treated Ti64 alloy discussed above. The preservation of the high fraction of the β phase is another important feature of concentration modulation during in situ alloying.

As appreciated by a skilled person in the art, all the four elements (Fe, Cr, Ni, Mo) in 316L powders are strong β-stabilizers in titanium alloys. Thus, in the concentration modulated alloy in the present invention, those regions enriched in β-stabilizers can preserve a more fraction of β phase under the high cooling rate.

Figure 19A:
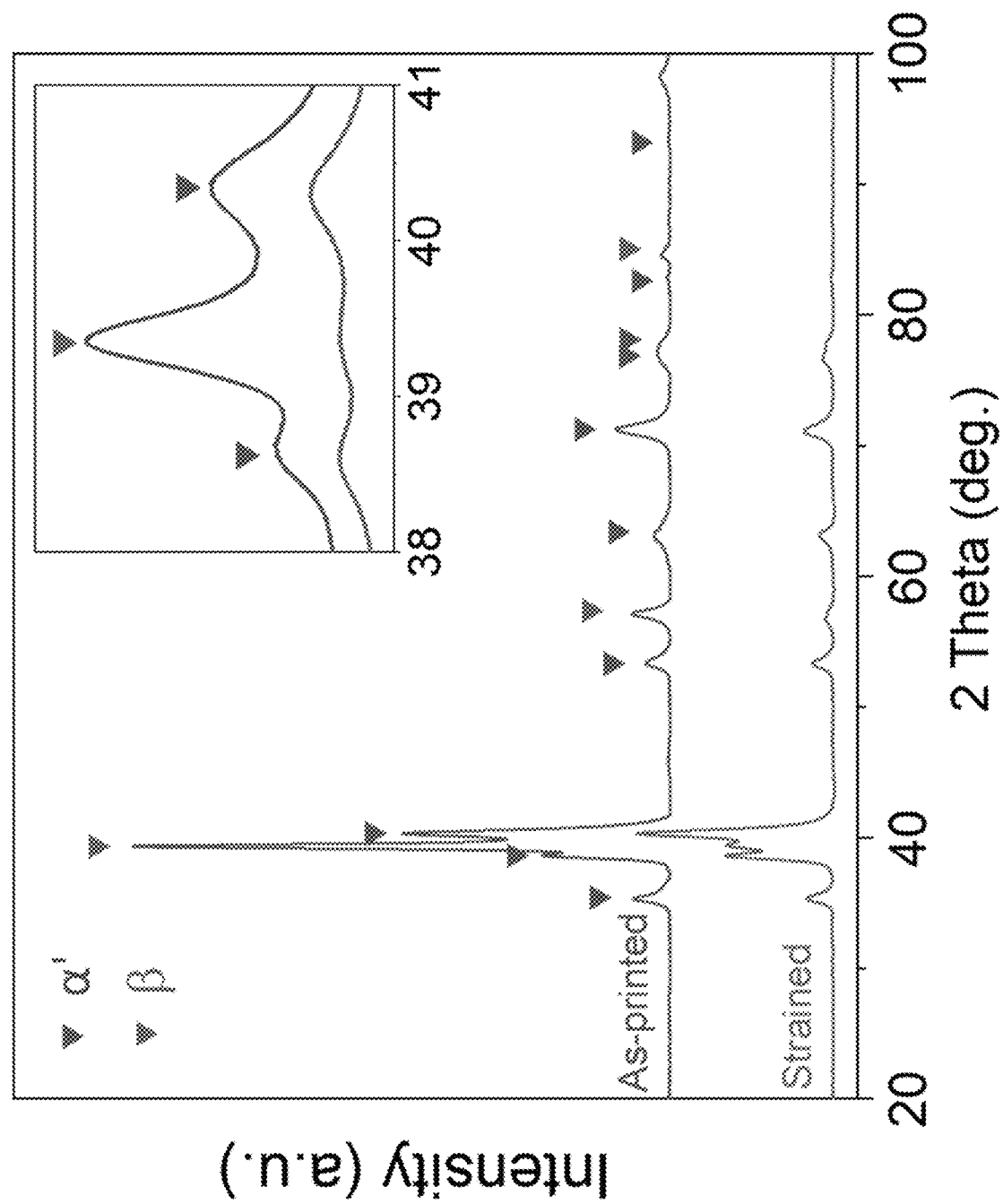
FIG. 19A is graph showing the X-ray diffraction (XRD) profiles of the microstructure in a Ti64-316L alloy before and after a tensile test.
Figure 19C:
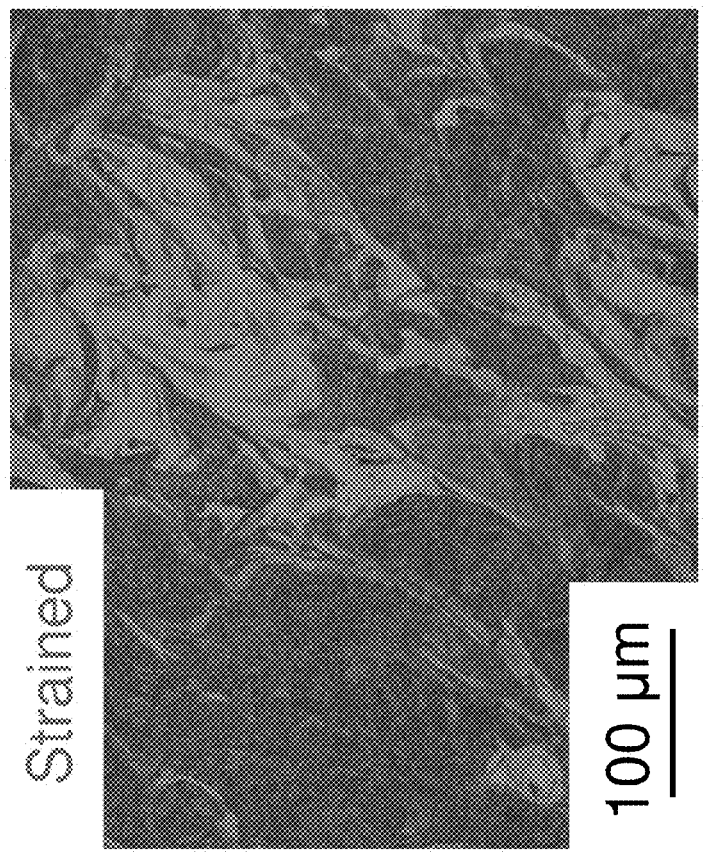
FIG. 19C is an electron backscatter diffraction (EBSD) phase image of a Ti64-316L alloy after the tensile test.
Figure 19B:
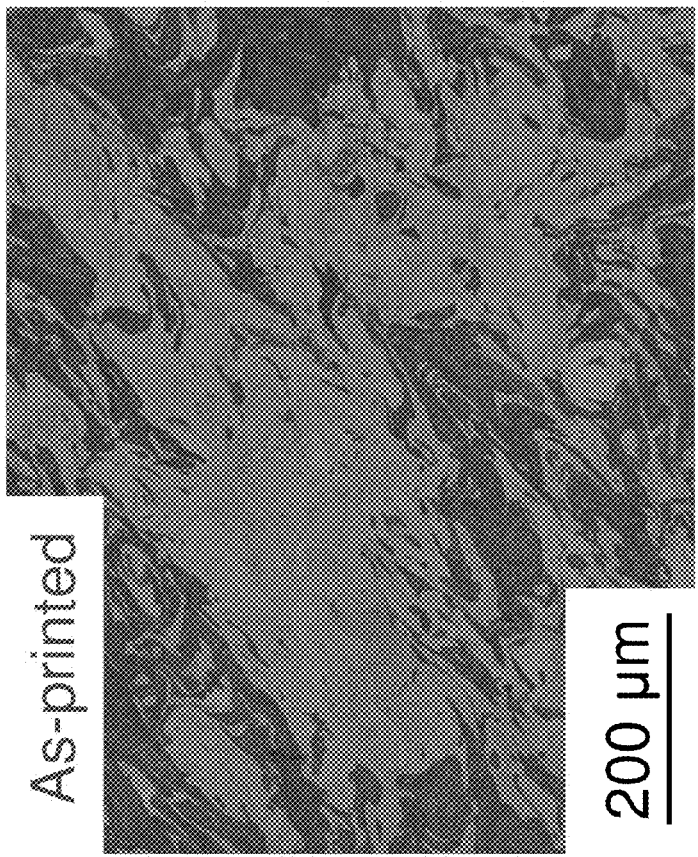
FIG. 19B is an electron backscatter diffraction (EBSD) phase image of a Ti64-316L alloy before the tensile test.

More importantly, the preserved β phase is mainly a metastable β phase. During deformation, the stress induced phase transformation takes place, which enhances the strength and ductility of the alloy. Referring to FIG. 19A, the XRD diffraction patterns show that, after strained for 9%, the peak intensity of $(110)_\beta$ at 39.4° and $(200)_\beta$ at 57.5° decreases dramatically.

Figure 19D:
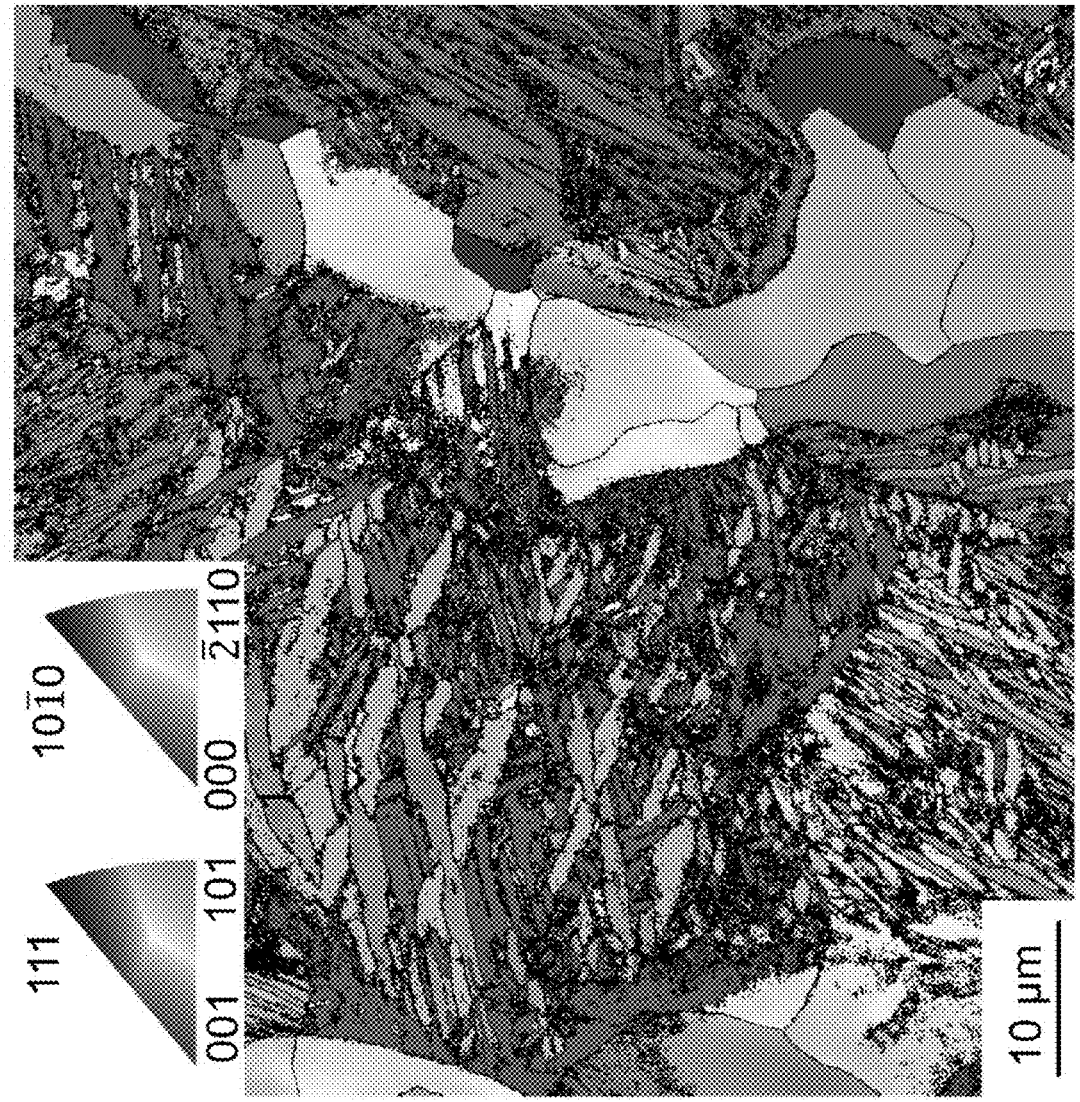
FIG. 19D is an enlarged electron backscatter diffraction (EBSD) inverse pole figure (IPF) map of the box in FIG. 19C.

According to the Reference Intensity Ratio (RIR) method, the β phase fraction decreases. This is also confirmed by the EBSD phase maps in FIGS. 19B and 19C. Most of the β phase transforms into the acicular α' martensite during deformation, and the stress-induced martensite is confined within the prior-β grains (FIG. 19D).

Since the β-stabilizers determine the stability of the β phase under deformation, the β phase transforms to α' martensite continuously during deformation. As a result, the Ti64-316L alloy a as-printed shows transformation-induced

TABLE 2

Mechanical properties of the as-printed Ti64-316L alloy.

| | $\sigma_y$ (MPa) | $\sigma_{UTS}$ (MPa) | $\varepsilon_u$ (%) | Hardness (HV) | Modulus (GPa) | Δσ (Mpa) |
|---|---|---|---|---|---|---|
| As-printed Ti64-316L | 984 ± 14 | 1297 ± 10 | 8.88 ± 0.22 | 398 ± 36 | 97.1 ± 2.5 | 313 ± 11 |

Figure 18:
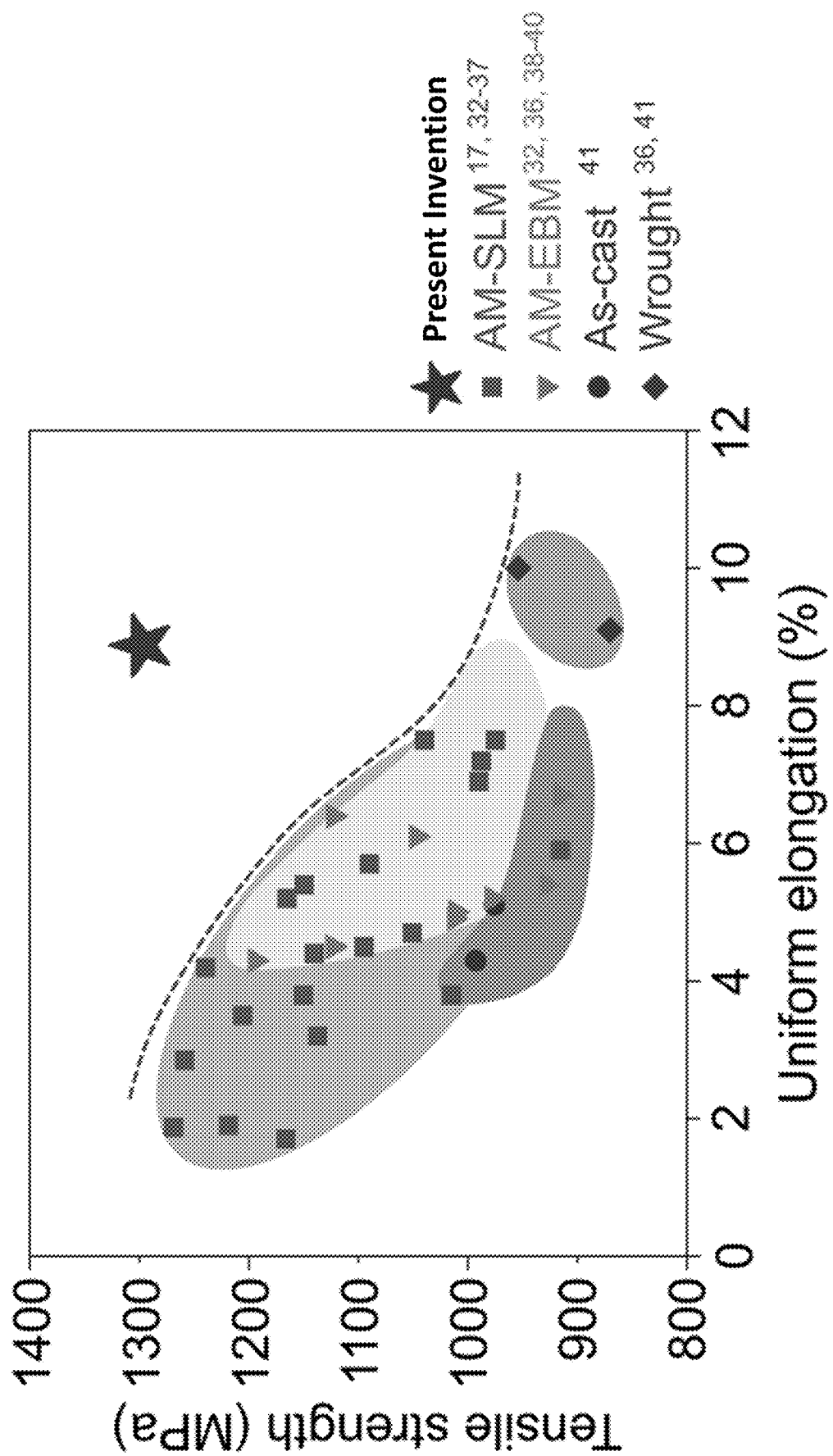
FIG. 18 is a graph of showing the comparison of tensile strength against uniform elongation between a Ti64-316L alloy and a Ti64 alloy produced by different additive manufacturing methods and conventional technologies.

FIG. 18 is a graph of showing the comparison of tensile strength against uniform elongation between the as-printed Ti64-316L alloy and the Ti64 alloy produced by different additive manufacturing methods and conventional technologies. It is demonstrated that even comparing to other additively manufactured Ti64 alloy by SLM, electron beam melting (EBM), etc. as well as wrought Ti64, the Ti64-316L alloy in the present invention exhibits the supreme comprehensive mechanical properties, which simultaneously achieves the and highest strength ductility regardless of the strength-ductility trade-off dilemma. In addition, a superb work-hardening ability ($\sigma_{UTS}-\sigma_y=291$ MPa) is observed, plasticity (TRIP) effect over a large range of strain, which leads to an excellent work-hardening capacity during the tensile test.

Accordingly, the present invention provides a method for microstructure control and mechanical property optimization in additive manufacturing by in situ alloying. By simply mixing different metal or alloy powders or wires together, the additive manufacturing process allows novel microstructures with unprecedented mechanical properties to be formed.

By building up materials flexibly layer by layer or spot by spot, it is feasible to mix powders or wires of different chemical compositions together in any proportions before forming a target alloy. More importantly, since the manufacturing process simply involves the melting and re-solidification of metal powders or wires under direct energy sources, a great flexibility is provided to in situ control the microstructure, phase constitution and even concentration heterogeneity for mechanical property optimization by choosing different powder types, proportions, as well as processing parameters.

It is also demonstrated that the method in the present invention is capable of producing a low-cost, high-performance 3D printed titanium alloy, based on a combined effect with one or more ways of phase-induced plasticity, fine-grain strengthening, solid solution strengthening and hetero-structured strengthening, regardless the strength-plasticity trade-off. Due to its high performance and low cost, the Ti64-316L alloy in the present invention can be widely used in automotive, aerospace, defense equipment, marine engineering, bio-structural materials, complex precision parts and other fields.

The method and the alloys manufactured using the product in the present invention offer different advantages over the conventional metallurgy processes involving, for example, casting and forging, and the alloys manufactured using these processes. For example, the method leads to a faster alloy design method since it can be performed in one system from alloy design to manufacturing, compared to different systems in conventional metallurgy processes. The method requires lower costs for raw materials (since readily available commercial materials are utilized), designing, machining, tooling and assembling. The alloys in the present invention exhibit better mechanical properties with a higher reliability. In terms of alloy design, testing, application and production, the method requires distinctively lower costs for replacing current product and alloy design lines.

Overall, the method in the present invention provides a unique way to rejuvenate lots of conventional commercial alloys (such as Ti-, Al-, Mg-alloys, steels, Ni-based superalloys) that are currently not well suitable for additive manufacturing. Furthermore, the in situ alloying method provides a powerful metallurgical tool that shed lights on a rapid alloy design of new materials for structural applications in the age of 3D printing.

It will be appreciated by persons skilled in the art that numerous variations and/or modifications may be made to the invention as shown in the specific embodiments without departing from the spirit or scope of the invention as broadly described. For example, although the method is described above to be performed using the system in the preferred embodiment, other systems and devices are also contemplated in the present invention, e.g. a 3D printer including more or less components.

The described embodiments of the invention should therefore be considered in all respects as illustrative, not restrictive. Any reference to prior art contained herein is not to be taken as an admission that the information is common general knowledge, unless otherwise indicated.

The invention claimed is:

1. A method of additively manufacturing an alloy structure based on in situ alloying, the method comprising the steps of:
   (a) supplying, at a target location, a mixture of:
      titanium Ti-6Al-4V powder and
      316L stainless steel 67.5Fe-18Cr-12Ni-2.5Mo powder;
   (b) applying an energy source to the target location by controlling a duration and/or a dosage of irradiation provided by the energy source in such a way as to (i) melt the mixture disposed at the target location to create a melt pool and (ii) partially mix the molten mixture by convection within the melt pool;
   (c) solidifying or allowing solidification of the molten mixture to form a portion of the alloy structure, the alloy structure consisting of an alloy of the titanium Ti-6Al-4V and the 316L stainless steel 67.5Fe-18Cr-12Ni-2.5Mo; and
   (d) repeating steps (a) to (c) at a plurality of target locations in a three-dimensional space to produce the alloy structure such that the alloy structure produced has, for the entire alloy structure, a microstructure with a $\beta$ phase of the alloy and an $\alpha'$ phase of the alloy; and
   wherein the alloy comprises a first average of about 94 to 98 wt % of the Ti, Al and V elements of the titanium Ti-6Al-4V and a second average of about 2 to 6 wt % of the Fe, Cr, Ni and Mo elements of the 316L stainless steel 67.5Fe-18Cr-12Ni-2.5Mo;
   the steps (b) produce, within the melt pool and throughout the alloy structure, enriched sites enriched in the Fe, Cr, Ni and Mo elements of the 316L stainless steel 67.5Fe-18Cr-12Ni-2.5Mo relative to the second average, and depleted sites depleted in the Fe, Cr, Ni and Mo elements of the 316L stainless steel 67.5Fe-18Cr-12Ni-2.5Mo relative to the second average;
   the enriched sites comprise the $\beta$ phase and 5.8 to 7.8 wt % of the Fe, Cr, Ni and Mo elements of the 316L stainless steel 67.5Fe-18Cr-12Ni-2.5Mo, and
   the depleted sites comprise the $\alpha'$ phase and 0.8 to 2.8 wt % of the Fe, Cr, Ni and Mo elements of the 316L stainless steel 67.5Fe-18Cr-12Ni-2.5Mo.

2. The method according to claim 1, wherein the energy source comprises a laser beam, an electron beam, or an arc beam.

3. The method according to claim 1, further comprising the step of mixing the titanium Ti-6Al-4V powder and the 316L stainless steel 67.5Fe-18Cr-12Ni-2.5Mo powder to form the mixture by mechanical vibrating, ultrasonic vibrating, stirring, and/or grinding.

4. The method according to claim 1, wherein step (a) comprises adjusting a flow or feed rate of the mixture.

5. The method according to claim 1, wherein step (a) comprises supplying the titanium Ti-6Al-4V alloy powder and the 316L stainless steel 67.5Fe-18Cr-12Ni-2.5Mo powder using powder spreading, powder feeding, or spraying.

* * * * *